(12) United States Patent
Roach et al.

(10) Patent No.: US 6,453,042 B1
(45) Date of Patent: *Sep. 17, 2002

(54) METHOD AND SYSTEM FOR REMOTE TELEPHONE CALIBRATION

(75) Inventors: David T. Roach; Daniel W. Mauney, both of Austin, TX (US); Kenneth S. Swinson; Medford A. Dyer, both of San Diego, CA (US); Joseph E. Talbot, Helendale, CA (US)

(73) Assignee: Jabra Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/971,954

(22) Filed: Nov. 17, 1997

Related U.S. Application Data

(63) Continuation-in-part of application No. 08/593,953, filed on Jan. 30, 1996, now Pat. No. 5,734,713.

(51) Int. Cl.[7] .......................... H04M 1/24; H04M 11/00
(52) U.S. Cl. ................... 379/395; 379/392.01; 379/404
(58) Field of Search ........................... 379/395, 387.01, 379/387.02, 388.04, 388.06, 390.01, 404, 3, 22.02, 74, 93.02, 102.01, 102.02, 392.01

(56) References Cited

U.S. PATENT DOCUMENTS

| | | | |
|---|---|---|---|
| 3,637,954 A | 1/1972 | Anderson et al. | 179/175.31 E |
| 4,071,704 A | 1/1978 | Moed | 179/15 BF |
| 4,180,709 A | 12/1979 | Cosgrove et al. | 179/2 AM |
| 4,273,970 A | 6/1981 | Favin et al. | 179/175.3 R |
| 4,788,708 A | 11/1988 | Hendrix | 379/6 |
| 4,807,274 A | 2/1989 | Kousa | 379/6 |
| 4,862,492 A | 8/1989 | Zwick | 379/6 |
| 4,879,738 A | 11/1989 | Petro | 379/3 |
| 4,887,288 A | 12/1989 | Erving | 379/6 |
| 4,937,850 A | 6/1990 | Borbas et al. | 379/6 |
| 5,073,919 A | 12/1991 | Hagensick | 379/29 |
| 5,226,086 A | 7/1993 | Platt | 381/58 |
| 5,734,713 A | * 3/1998 | Mauney et al. | 379/395 |

\* cited by examiner

Primary Examiner—Wing F. Chan
(74) Attorney, Agent, or Firm—Lloyd W. Sadler

(57) ABSTRACT

A method and system for remotely calibrating a headset telephone with a reliable, accurate and easy to use user interface is provided. This method makes use of the remote programmability of advanced telephone headsets and DTMF signal encoding and permits the customer-user to instigate the calibration procedure with an ordinary telephone call. The invention provides the means by which the optimum settings can be transmitted to the headset, loaded and stored in the headset, thereby improving the audio quality of telephone headsets by providing adjustment steps for such audio qualities as microphone gain (transmit level), speaker gain, background noise and echo cancellation, filter functions and diagnostics. This method also provides audio feedback to a customer service representative performing the calibration to insure that the commands and adjustments were properly received. It also incorporates a remote override and storage process, as well as a security gateway to ensure that only authorized changes are made in the programming of the headset. This invention contemplates the audio problems inherent in advanced telephone headsets and provides a user-friendly, reliable and programmable solution.

1 Claim, 7 Drawing Sheets

METHOD AND SYSTEM FOR REMOTE TELEPHONE CALIBRATION

This patent application is based on, and is a continuation-in-part, of pending U.S. patent application Ser. No. 08/593,953, filed on Jan. 30, 1996. Priority is hereby claimed to all material disclosed in this pending parent case.

BACKGROUND OF THE INVENTION

1. Field of the Invention

This invention relates to the calibration and adjustment of signal levels and noise removal in telephone equipment. More specifically, this invention relates to a method of adjusting microphone signal level, speaker volume, noise and echo cancellation and to do so remotely over the telephone lines. This invention is particularly adapted to the unique requirements of hands-free telephone headsets, in that it is designed to adapt to different ambient noise environments. This invention provides an accurate user-friendly means for calibrating hands-free telephone headsets to operate properly with most telephone base units.

2. Description of Related Art

Various approaches are currently used to adjust headsets to be used with telephone base units. Typically, multi-position switches are provided for the user to set into different positions depending on the type of telephone base unit with which the headset is being used. A list of telephones cross referenced to switch positions may be provided. These approaches range from having six switch positions to over sixteen switch positions.

Other approaches employ special purpose electronics which are connected directly to the headset and are generally used to test the headset rather than calibrate it to a particular telephone base unit.

For general background material, the reader is directed to U.S. Pat. Nos. 3,637,954, 4,071,704, 4,180,709, 4,273,970, 4,788,708, 4,807,274, 4,879,738, 4,937,850, 4,862,492, 4,887,288, 5,073,919, and 5,226,086 each of which is hereby incorporated by reference in its entirety for the material disclosed therein.

SUMMARY OF THE INVENTION

It is desirable to provide a system for the calibration of telephone headsets, adapting said headsets to telephone base units, and to do so with an easy to activate remote procedure which communicates over the telephone lines to ensure an improved signal quality for the headset user.

It is the general objective of this invention to properly calibrate telephone headsets for use with most telephone base units.

It is a further objective of this invention to provide a method of calibrating telephone headsets remotely over the telephone lines.

It is a further objective of this invention to provide a telephone headset calibration method that includes the capability of adjusting the headset microphone signal level.

It is a further objective of this invention to provide a remote telephone calibration method that includes the capability of adjusting the transmit level of the telephone headset.

It is a further objective of this invention to provide a remote telephone calibration method that can customize the telephone headset such that it adapts to an individual user's preferences and to an individual user's environment.

It is a further objective of this invention to provide a remote telephone calibration method that is capable of adjusting noise cancellation and can be adaptable to different ambient noise environments.

It is a further objective of this invention to provide a remote telephone headset calibration method capable of fine tuning echo cancellation.

It is a further objective of this invention to provide a remote telephone calibration method that is accomplished easily and without any technical intervention by the user.

These and other objectives of this invention are achieved by a method comprising the steps of: the user calling the support center using the telephone headset, activating the headset, placing the headset in programming mode, setting the headset transmit level, fine tuning the headset to eliminate the "echo", setting noise cancellation level, adjusting the frequency response, setting speaker gain, and storing the settings in the headset.

In a preferred embodiment, the method of this invention is accomplished with the aid of software programmed and stored in the headset circuitry. Also, in this preferred embodiment, the invention operates on a Jabra 1000 telephone headset with Earphone attachment. For the purposes of this disclosure, the Jabra 1000 telephone headset with Earphone attachment will be simply referred to as the Jabra 1000.

DETAILED DESCRIPTION OF THE INVENTION

Figure 1:
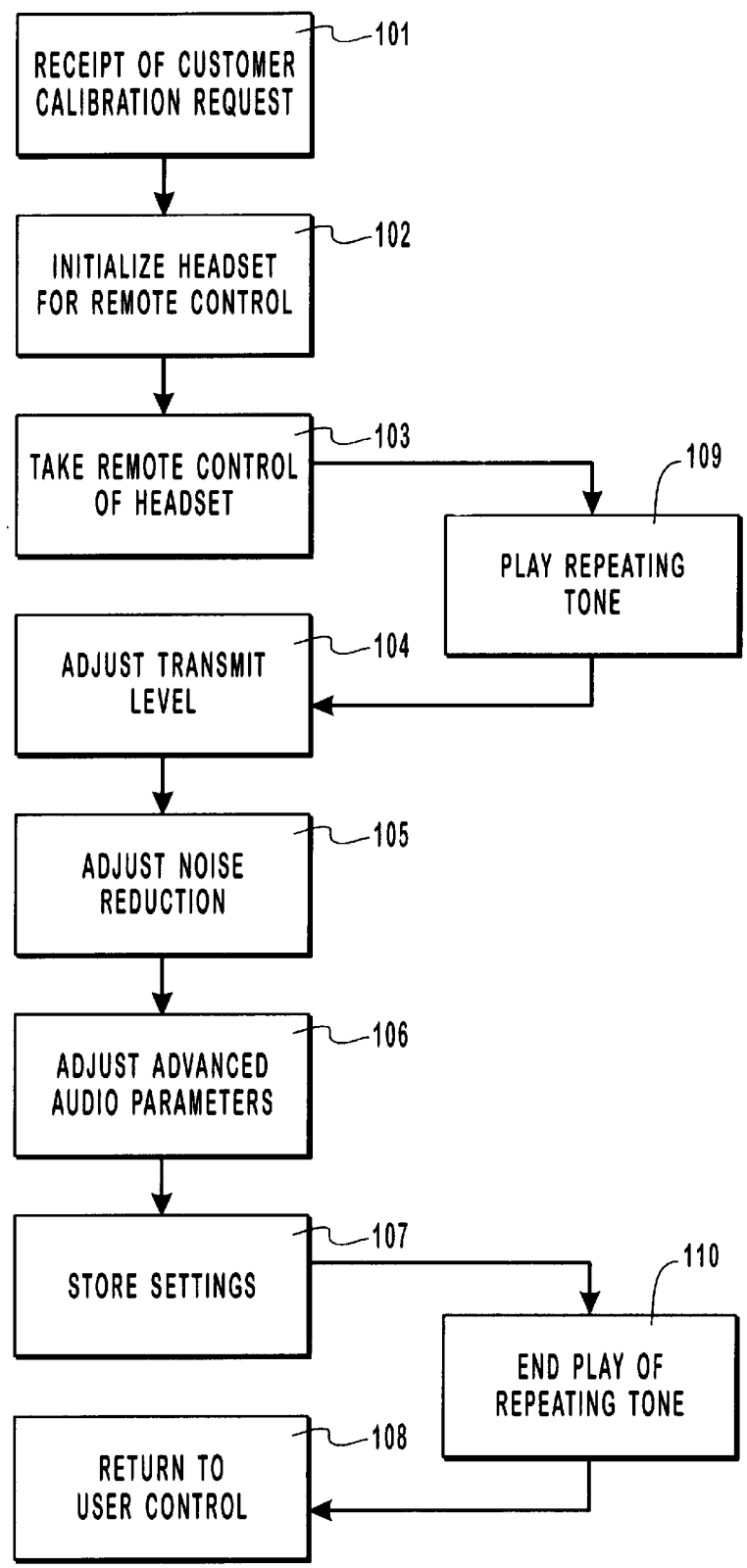
FIG. 1 is a flow diagram showing the top level steps of one preferred embodiment of the method of the invention.

FIG. 1 depicts the top level steps of the preferred embodiment of the invention. The first step of the method 101 is the receipt of a customer calibration request. In the preferred embodiment of the invention, this step is initiated by a customer telephone call to customer service. While the customer service function may be handled by automated equipment, the current best mode involves a human customer service representative. Once the customer has contacted customer service the customer is instructed to use the headset (in the preferred embodiment a Jabra 1000). Once the customer calibration request is received 101, the customer's headset is initialized for remote control 102. In this way the headset is set for control by the customer service representative, remotely over the telephone lines. Next, customer service takes remote control of the headset 103. Once customer service has control of the headset calibration can begin.

A telephone headset has many adjustable audio qualities. This invention provides a process of making these adjustments in a simple reliable remote manner. Many telephone headsets will require some but not all of the possible adjustments or calibrations. This process therefore does not require that every quality or parameter be calibrated, rather customer service is provided the means for directly calibrating each quality or parameter without interfering with qualities or parameters that do not require calibration.

Step 104 provides the capability to adjust the transmission level of the headset. The transmission level involves the audio received from the customer via a microphone in the headset. Adjustment of transmission level 104 provides the appropriate volume to the receiver of a telephone call initiated by a headset telephone user.

Adjustment of noise reduction 105 involves the compensation for background noise. An objective of a well calibrated headset is the cancellation of background noise without deteriorating the quality of the user's voice.

A variety of audio parameters are adjustable in the adjustment of advanced audio parameters step 106. In the preferred mode of this invention these audio parameters include such audio qualities as: signal attenuation, speaker gain, echo, microphone circuit adjustments, speaker circuit adjustments, and audio filter control. In the preferred embodiment these qualities are adjusted by the transmission of parameter codes and preset variables to the control software operating within the headset electronics.

After the completion of calibration of the headset, the process of the invention provides for storing of the settings and parameters 107 in the headset memory circuitry. This storage of the settings and parameters 107 insures that the headset maintains the values and adjustments for the user after the user regains control of the headset.

The return to user control step 108 ends the calibration of the headset, permitting the user to employ the headset in normal telephone communications.

FIG. 1 further shows the addition of an audio feedback feature which is initiated 109 by the remote control function in the system of the invention. Once the customer service takes control of the head set a repeating musical tune is played through the head set. The addition of this audio feedback feature provides several novel and important enhancement to the operation of the system, including the customer is thereby informed that the unit is functioning and that the calibration process is continuing so that the customer is not tempted to intervene and halt the process (the customer can be instructed to take certain reset action should the tune not begin at the appropriate time or should it end without the customer service operator returning to the line); and the audio feedback tune masks the potentially undesirable sounds of audio signals used during the calibration process. The preferred embodiment of this portion of the invention is provided in the provided source code found at the end of the software source code section. The reader should note that alternative tunes, tones and signal attenuation can be used without departing from the essence of this portion of the invention. Moreover, the tune can alternatively be generated or altered by a process in the headset, as opposed to being transmitted from the customer service center.

Once the headset is calibrated, the repeating tone initiated in step 109 is ended in step 110.

Figure 2:
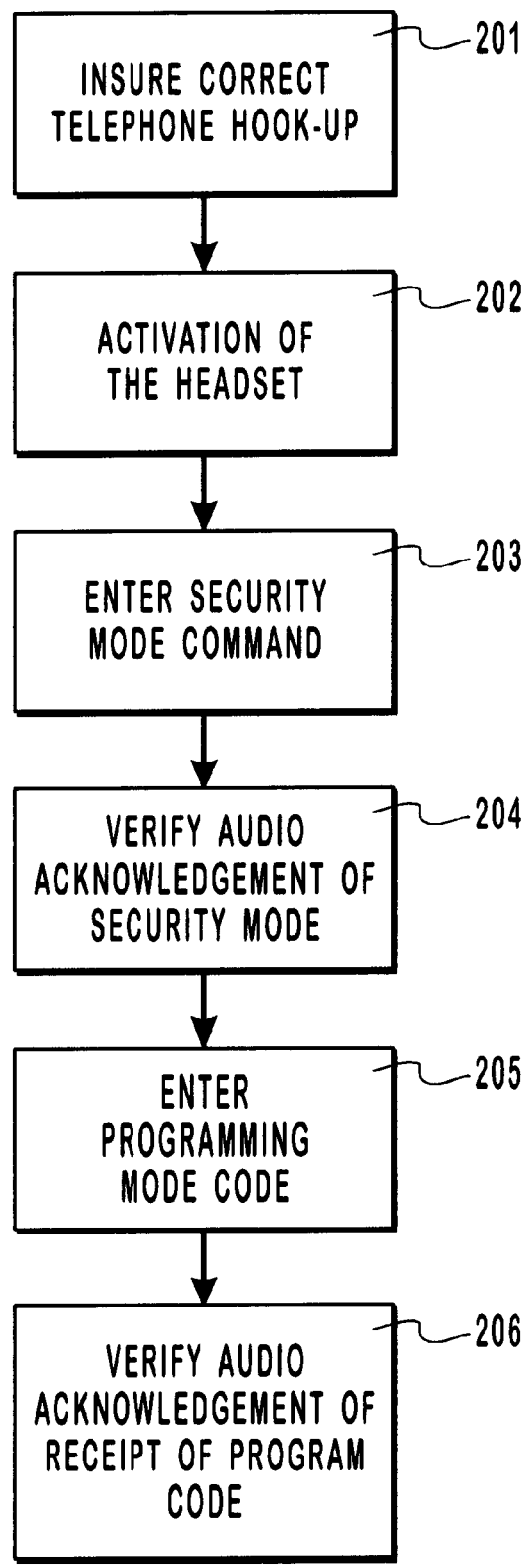
FIG. 2 is a more detailed flow diagram of the initial steps of one preferred embodiment of the invention.

FIG. 2 provides a more detailed view of the initialize headset for remote control 102 and the take control of headset step 103. Before the headset can be calibrated customer service must work with the customer to insure that the headset is correctly hooked up to the telephone base unit 201. In the preferred embodiment of this invention, using the Jabra 1000, the procedure for hooking up the headset is designated by icons on the base of the unit that show where each cord should be connected.

Once this is accomplished, customer service asks the customer to activate the headset 202. This is done in the preferred embodiment, using the Jabra 1000, by pressing on a button on the base of the headset unit. At this point, the customer puts on the Earphone and waits for approximately 45 seconds. During this, approximately 45 second, time period customer service should be able to take control of the headset 103, set the transmit level 104, enter a preset value using the adjust advanced audio parameters step 106 and to converse with the customer through the preferred Jabra 1000.

Taking control of the headset 103 in the preferred Jabra 1000 involves passing through a security mode and into the programming modes. The security mode consists to insure that inadvertent or unauthorized programming of the headset does not occur. In the preferred use of the Jabra 1000, the security mode is entered by pressing a button or combination of buttons on the control keyboard 301 to effect the entering of the security mode command 203. Once the security mode is accessed a short "machine gun" sound is produced 204 to inform customer service that the Jabra 1000 is now in security mode. An alternative means of entering security mode 203 is through a manual override, permitting the customer-user to activate security mode. Manual override is accomplished by having the customer rapidly press the activation button on the base of the Jabra 1000 a predefined number of times. An alternative method of entering manual override is by depressing the activation button a predetermined period of time. When manual override is successfully completed the "machine gun" sound is produced 203 to inform customer service that the Jabra 1000 is now in security mode. At this time, the customer will hear the Jabra 1000 vocalize "Jabra."

Once the "machine gun" sound 203 has been heard customer service enters a programming mode code 205 after which a "pink" noise, a broadband waterfall like sound, is produced 206 to inform customer service that the Jabra 1000 has entered the programming modes.

Figure 3:
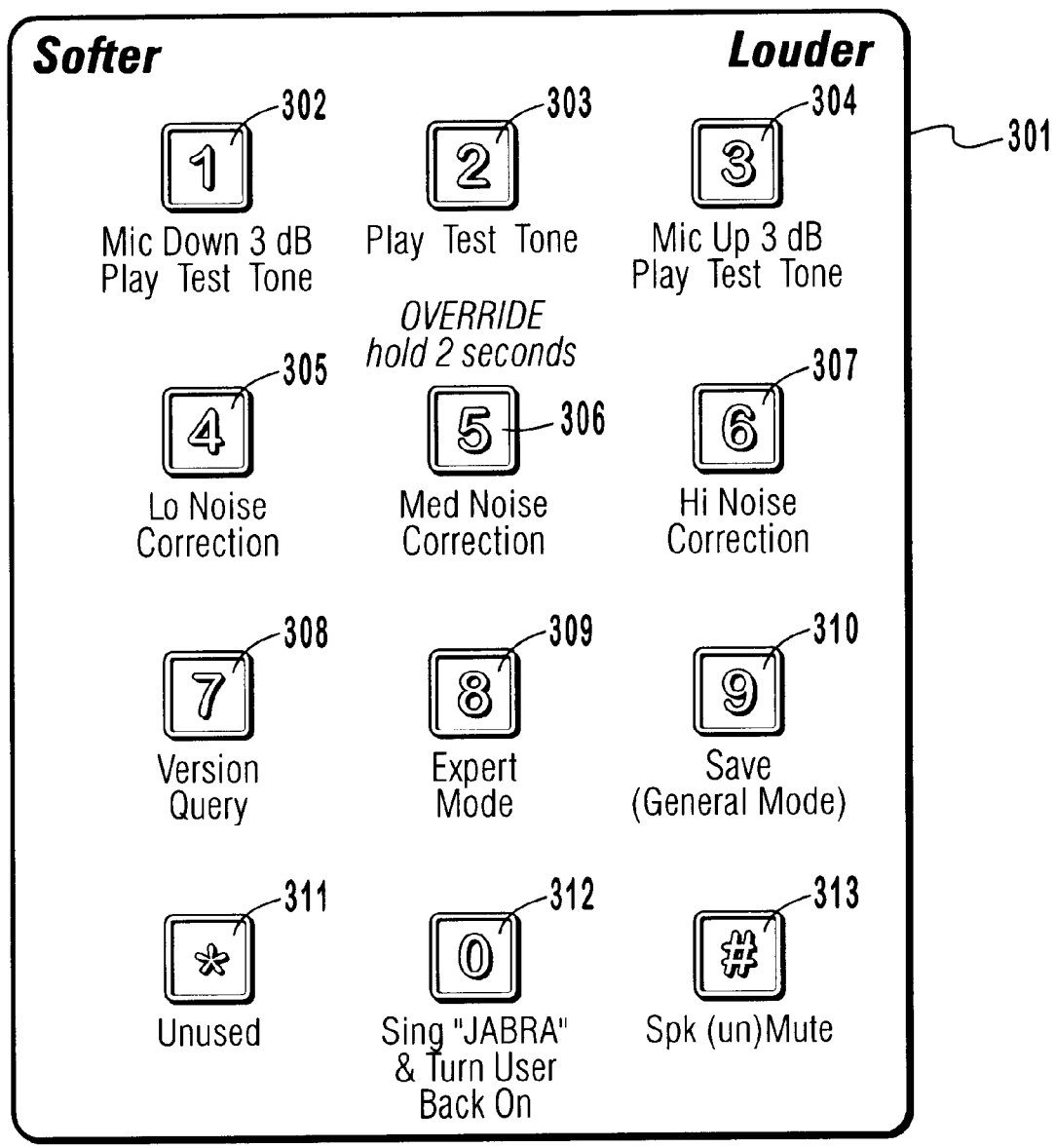
FIG. 3 is a diagram of the control keyboard used in the method of one preferred embodiment of the invention.

The programming modes consist of the general mode and the expert mode. The general mode is where the transmit levels 104 and noise cancellation levels 105 are set. The Jabra 1000, when first installed, starts up in the general mode. It will not work until it is programmed. FIG. 3 shows the control keyboard 301 used in the programming modes. The keyboard 301 is configured in a manner similar to that of a touch-tone telephone, with twelve buttons, designated 1 (302), 2 (303), 3 (304), 4 (305), 5 (306), 6 (307), 7 (308), 8 (309), 9 (310), * (311), 0 (312), and # (313). The 1 (302), 2 (303) and 3 (304) keys are used to set the transmit level. Specifically, the 1 (302) key turns the transmit level down 3 dB and causes a burst of a test tone to be played. The 2 (303) key plays a burst of a test tone at the current transmit level. The 3 (304) key turns up the transmit level 3 dB and plays a burst of a test tone. These transmit level adjustments 104 change the volume of the audio produced by the customer-user through the headset to the outside telephone connection. The burst of test tone, in the preferred embodiment sounds similar to a waterfall and will last approximately or 1 or 2 seconds. If the transmit level has been adjusted to its limits, either high or low, a "machine gun" sound is produced to inform customer service that the transmit level cannot be lowered or raised respectively.

Noise cancellation level 105 is also set in the general mode. This is accomplished using the second row of keys on the control keyboard 301. Specifically, 4 (305), 5 (306), and 6 (307). Pressing the 4 (305) key sets the Jabra 1000 for the lowest amount of noise cancellation. The Jabra 1000 will play back two low frequency beeps to indicate reception of the 4 (305) key. Pressing the 5 (306) key sets the Jabra 1000 for a medium amount of noise cancellation. The Jabra 1000 will play back two medium frequency beeps to indicate reception of the 5 (306) key. Entering a 6 (307) sets the Jabra 1000 to high amount of noise cancellation. The Jabra 1000 will play back two high frequency beeps to indicate reception of the 6 (307) key.

Pressing a 0 (312) key from the general mode will return the Jabra 1000 to user control. After pressing a 0 (312) the word Jabra is vocalized.

Pressing a 7 (308) key queries the Jabra 1000 for a version number. The version number is returned as DTMF tones.

Pressing a 8 (309) key will transfer from the general mode to the expert mode.

Pressing a 9 (310) key from the general mode saves the current settings or adjustments.

Pressing the # (313) key toggles a speaker mute. A low beep sound is produced to indicate that the speaker is muted. A high beep sound is produced to indicate that the speaker is not muted.

The * (311) key is not used in the current embodiment of the invention.

Figure 4:
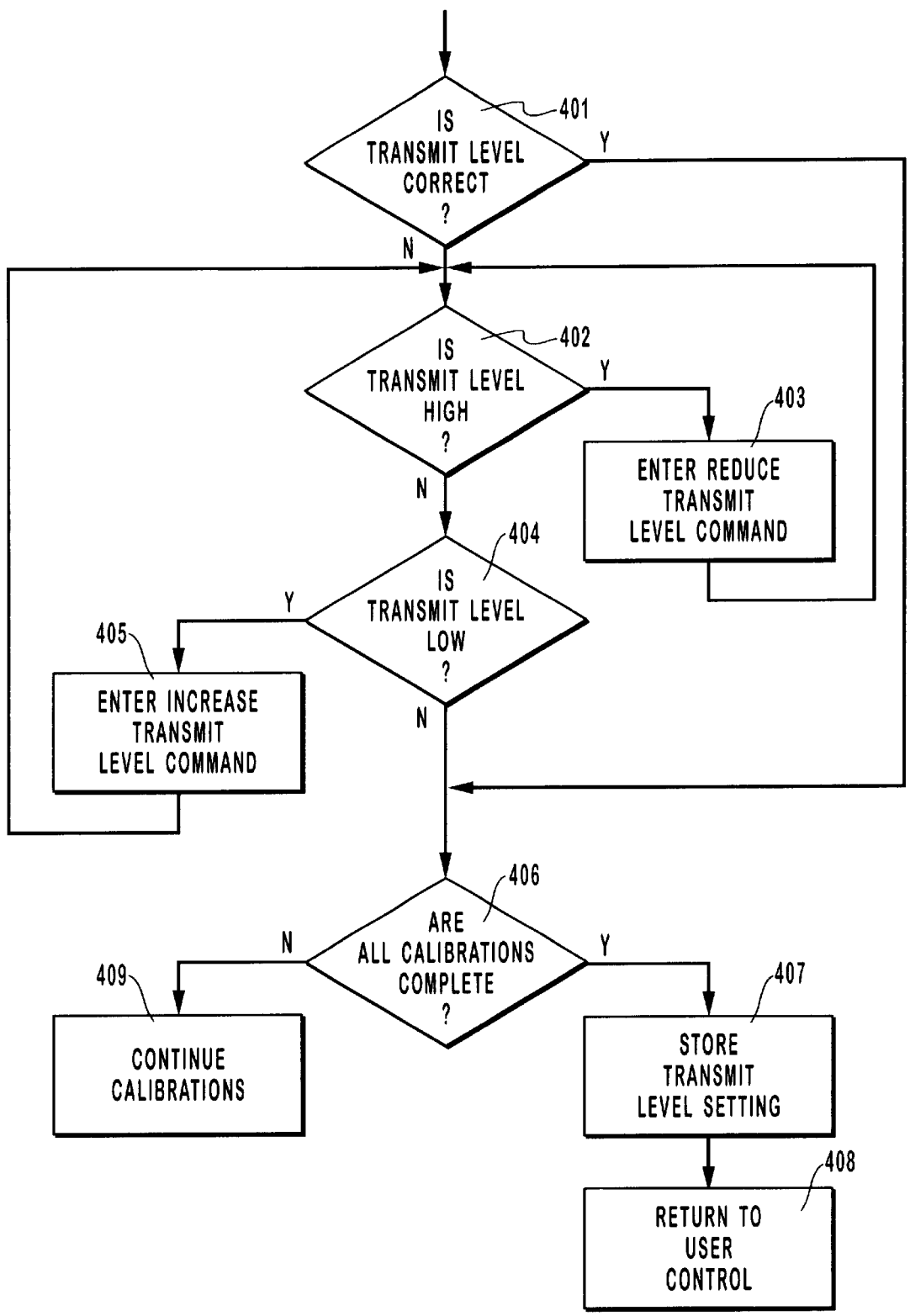
FIG. 4 is a detailed flow diagram of the adjustment of transmit level step of one preferred embodiment of the process steps of the invention.

FIG. 4 provides a detailed flow diagram of the process steps of adjusting the transmit level 104. A test of the transmit level is performed to determine if the level sounds correct 401. For the preferred Jabra 1000, the transmit level test is accomplished by pressing the 2 (303) key on the control keyboard 301. If the transmit level sounds correct the transmit level adjustment step is otherwise skipped, that is the process jumps to checking whether all calibrations are complete 406. If the transmit level is not correct, and therefore requires adjustments, a determination of whether the transmit level is high 402, and if not whether the transmit level is low 404 is performed. If the transmit level is too high, then the reduce transmit level command is entered 403. In the preferred embodiment using the Jabra 1000 is used, the reduce transmit level command is entered by pressing the 1 (302) key on the control keyboard 301. If the transmit level is too low, then the increase transmit level command is entered 405. The increase transmit level command, for the Jabra 1000 is the 3 (304) key. After either increasing 405 or reducing 403 the transmit level, it is again tested to determine whether the transmit level is high 402 or low 404. Once the transmit level is correct, a check as to whether all calibrations are complete 406 is performed. If all calibrations are complete the transmit level settings are stored 407 and control of the headset is returned to the customer-user 408. Storing of the settings 407 is accomplished with the Jabra 1000 by pressing the 9 (310) key of the control keyboard 301. Return to user control is accomplished by the pressing of the 0 (312) key of the control keyboard 301.

Figure 5:
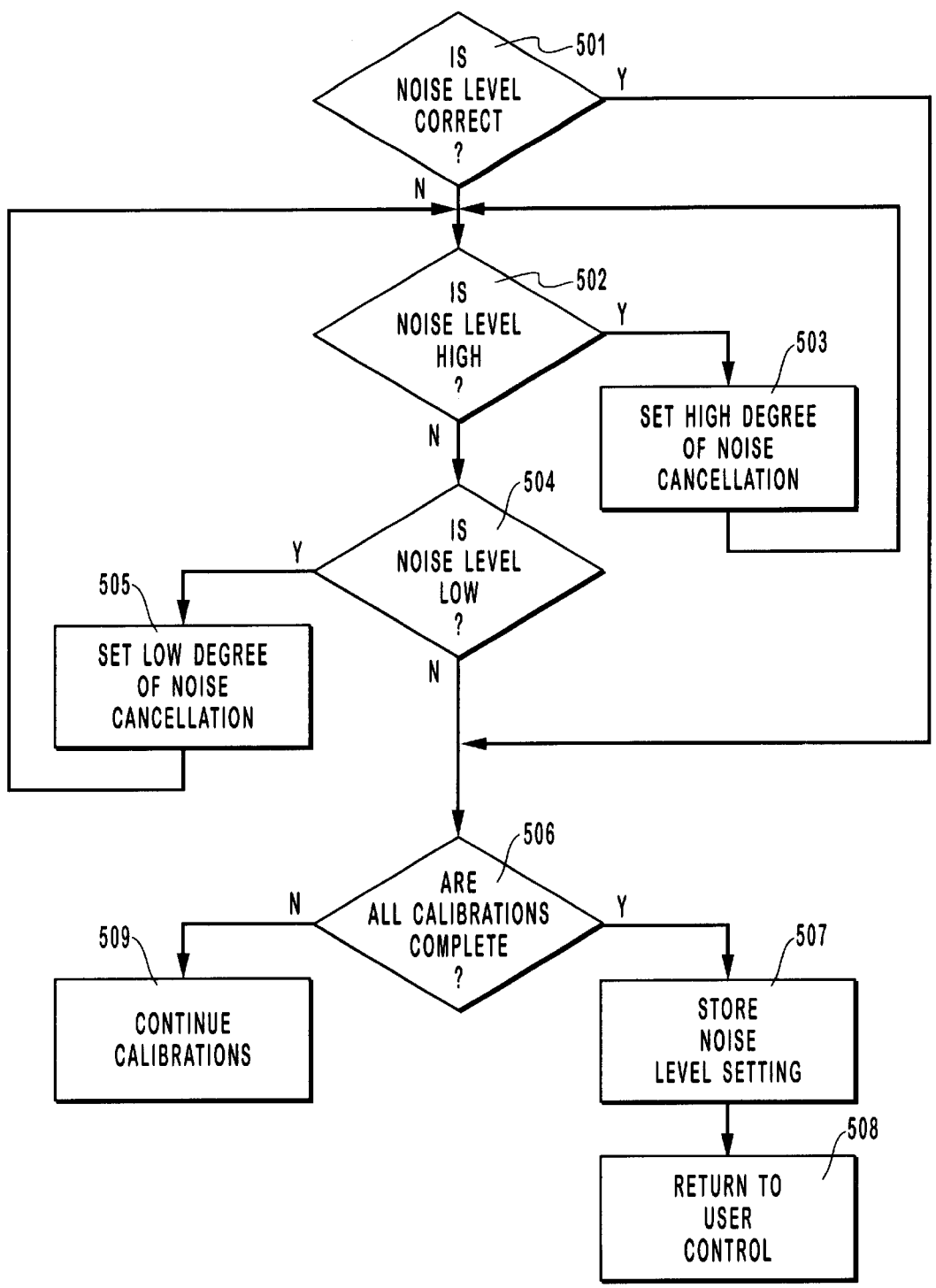
FIG. 5 is a detailed flow diagram of the adjustment of noise level step of one preferred embodiment of the process steps of the invention.

FIG. 5 provides a detailed flow diagram of the process steps of adjusting the noise cancellation level 105. A test of the noise level is performed to determine if the level sounds correct 501. If the noise level sounds correct the noise level adjustment step is otherwise skipped, that is the process jumps to checking whether all calibrations are complete 506. If the noise level is not correct, and therefore requires adjustments, a determination of whether the noise level is high 502, and if not whether the noise level is low 504 is performed. If the noise level is too high, then a high degree of noise cancelation command is entered 503. In the preferred embodiment using the Jabra 1000, the reduce noise level command is entered by pressing the 6 (307) key on the control keyboard 301. If the noise level is low, then a low degree of noise cancellation command is entered 505. The high noise cancellation command, for the Jabra 1000 is the 6 (307) key. The low noise cancellation command, for the Jabra 1000 is the 4 (305) key. After either increasing 505 or reducing 503 the noise cancellation level, it is again tested to determine whether the noise level is now high 502 or low 504. Once the noise level is correct, a check as to whether all calibrations are complete 506 is performed. If all calibrations are complete the noise level settings are stored 507 and control of the headset is returned to the customer-user 508. Storing of the settings 507 is accomplished with the Jabra 1000 by pressing the 9 (310) key of the control keyboard 301. Return to user control is accomplished by the pressing of the 0 (312) key of the control keyboard 301.

Figure 6:
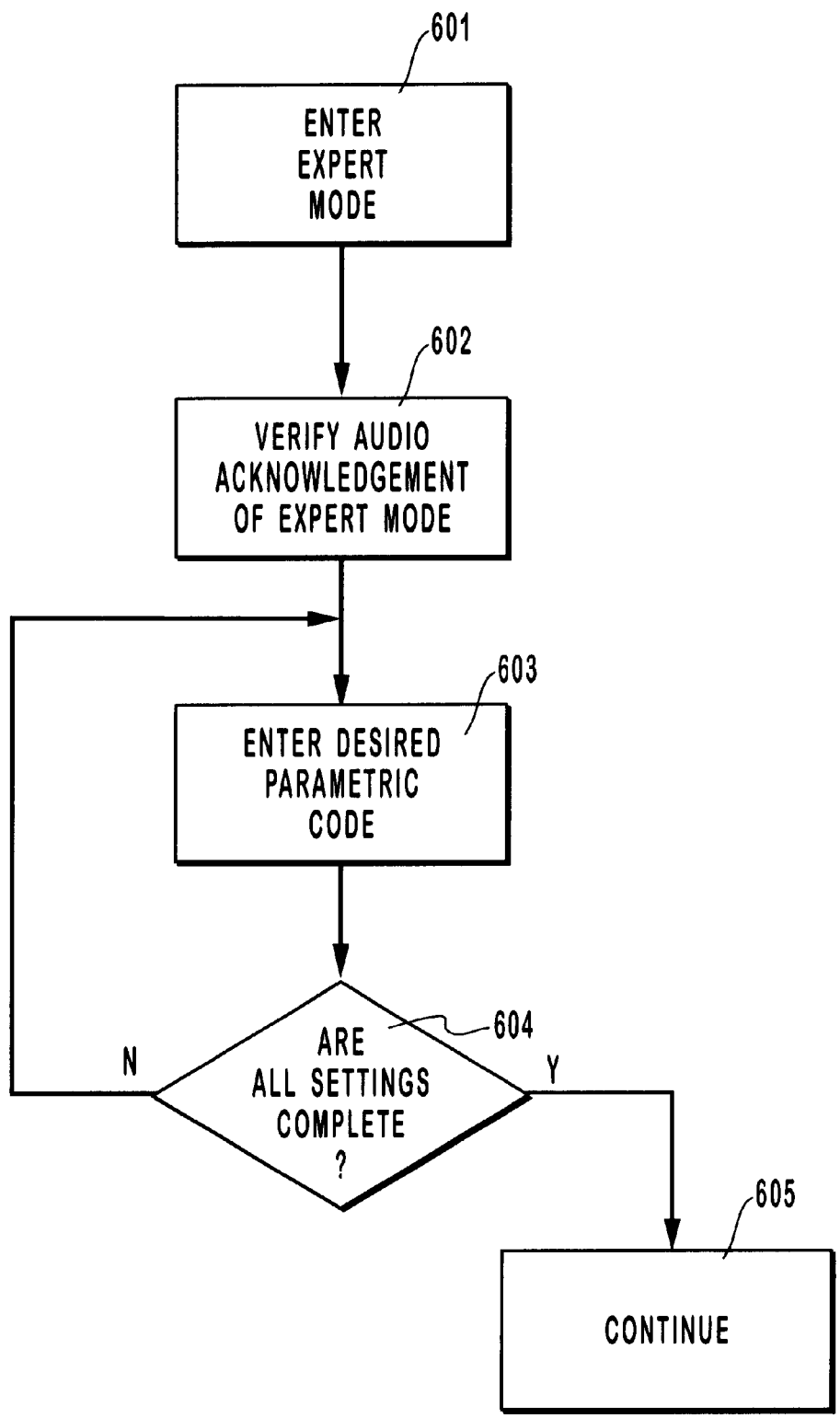
FIG. 6 is a detailed flow diagram of the adjustment of advanced audio parameters of one preferred embodiment of the invention.

FIG. 6 provides a more detailed flow diagram of the adjustment of advanced parameters 106 step of the invention. The calibration process in this invention includes the capability to adjust a wide variety of specific advanced audio processing parameters in the headset. The defined list of these parameters will naturally depend on the headset being calibrated and on the programmability of the headset. The preferred embodiment of the invention in its current best mode of operation works with the Jabra 1000. Therefore, the advanced audio processing parameters the invention is capable of calibrating in the Jabra 1000 include: sample rate, noise cancellation, speaker gain adjustments, echo adjustments, filter adjustments and filter functions, attenuation adjustments, as well as diagnostics and write to memory functions.

Before any parametric calibrations may be done the headphone must be placed in expert mode 601. Expert mode is accessed by pressing the 8 (309) key on the control keyboard 301. An audio acknowledgment of entering expert mode is produced 602. In the Jabra 1000, this audio acknowledgment is a burst of audio tones. Once in the expert mode preprogrammed microcoded routines may be initiated, functions may be activated, and variable thresholds may be set. Each by entering the desired parametric code 603 as a numeric sequence. In the current best mode of the invention, these numeric sequences consist of three or four numbers. When entering the numeric sequences, in the expert mode, a low frequency acceptance tone is given after each number. A slightly higher tone is generated after the last number in the sequence is accepted. At that point, a decision is made to determine if all desired parametric calibrations have been completed 604. If additional calibrations are necessary, they may be entered. If all calibrations are completed the process continues 604 to the storage step 107.

The storage of the settings 107 is accomplished in preferred embodiment of the invention by entering a 999 or 998 code sequence from the expert mode. Audio tones are generated informing customer service that the settings have been stored into memory.

Hitting the 0 (312) key three times producing a 000 code exits the expert mode, plays a "pink" noise, and returns the headset to general mode, entering a final 0 (312) key returns the headset to user control 108. At this point the user may use the calibrated headset in normal telephone communications.

Figure 7:
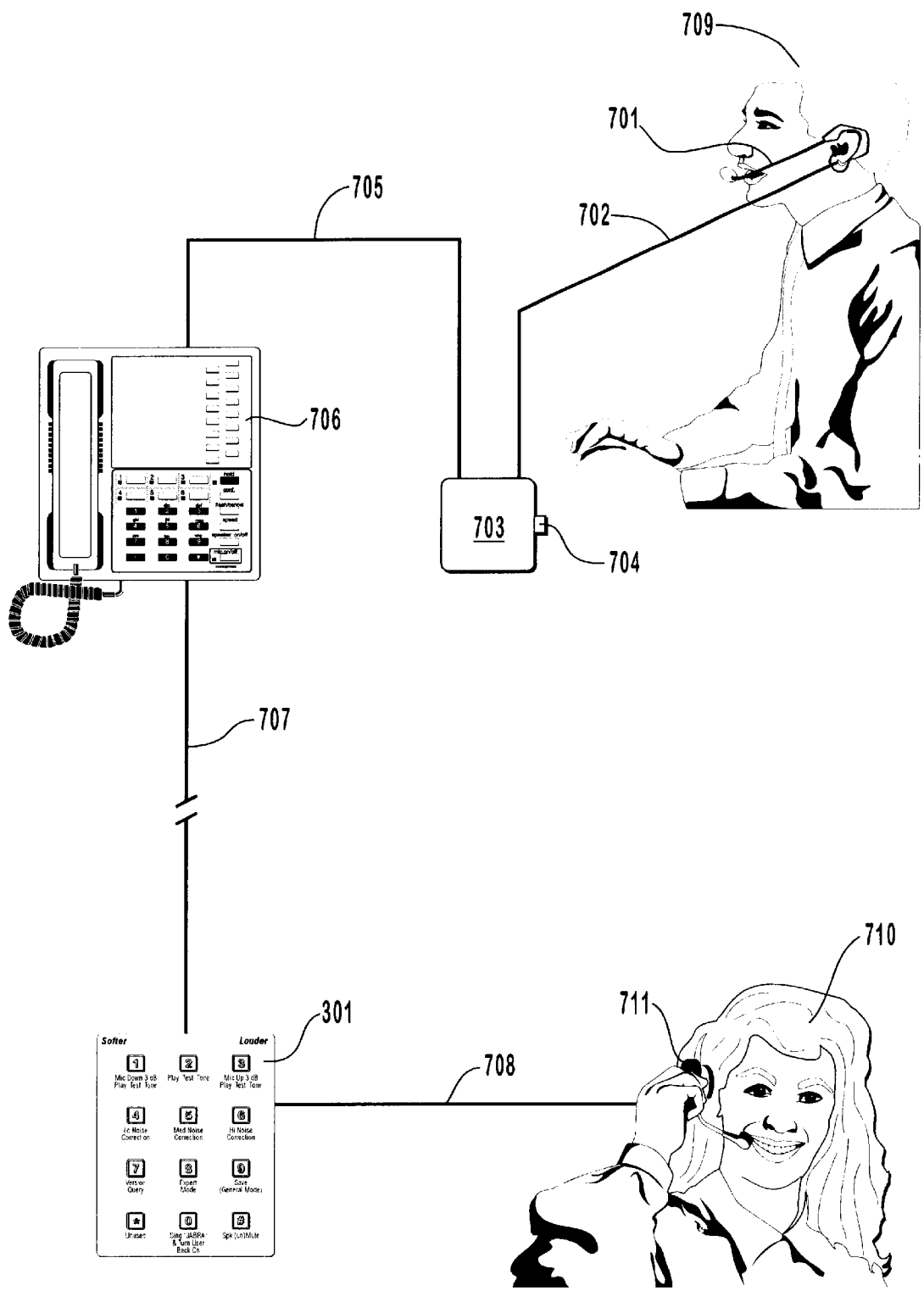
FIG. 7 is a depiction of the remote telephone calibration system showing the components used in a preferred embodiment of the method of the invention.

FIG. 7 shows a drawing of the system in which the invention operates. A customer-user 709 is wearing a headphone 701. The headphone 701 is electrically connected with insulated conductors 702 to a base unit 703. The base unit 703 has an activation button 704 which the customer-user presses to initialize the headset 102. The base unit 703 is electrically connected by standard telephone conductors 705 to a standard telephone unit 706. Once the customer calibration request 101 telephone call is made to customer service, this standard telephone unit 706 is connected through the telephone communication system 707 to a control keyboard 301. The control keyboard 301 is electrically connected, through standard telephone conductors 708, to a telephone receiver or telephone headset 711 to a customer service representative 710. This customer service representative 710 employs the capabilities of the control keyboard 301 and the circuitry and programs inherent in the headphone base unit 703 to perform the steps of this calibration invention. Note please that in alternative embodiments of the invention the customer service representative 710 may be replaced by full automated test equipment and the headphone base unit 703 may become directly incorporated in the headphone 701 itself or in the standard telephone unit 706. Also, alternative embodiments of the control keyboard 301 device may be achieved by programmable automatic test equipment.

In the preferred embodiment, the method of the invention is performed on a Jabra 1000 that has a base unit with the necessary calibration and programmability capabilities to make full use of the steps of the invention. However, it is possible to implement the invention on various other headphone hardware configurations, though naturally the specific functions and commands transmitted during the steps of the invention would differ. The current best mode of the invention relies on the operation of software programmed into the Jabra 1000 base unit. The Software Appendix which is included as a part of the disclosure of this patent application shows in detail how the functional steps described above are performed once the commands are received by the Jabra 1000.

The following software source code is provide as this software is the embodiment of the current best mode of much of the method of this invention. For this invention to perform in the current best mode, the following software source code listing is compiled and stored in the Jabra 1000 base unit.

```
/********************************************************************/
/* Module: rwr2.c          */
/*                         */
/* routines to write to    Atmel Flash   */
/*                         */
/* Rev 1.0  10 Feb 1995  DTR   */
/*                         */
/********************************************************************/
#include    <math.h>
#include    "globals.h"
#include    "dtmf.h"
#define            PageSize    128
           Pragma_Sect_text
Error RewriteParams(Boolean    dtmfAtStartup)
{
           short    pageArray[PageSize];
           short *  p;
           Error    err;
           err      =noErr;
           p =      &pageArray[0];
           /* NumberOfBurns          */
           if (0xFF ==   FetchWordInRom((short *)&PromParams)) {
                   *p++ = 1;/* we do this in case the rom gets written to all FF's */
           }
           else {
                   *p++ = 1 + FetchWordInRom((short *)&PromParams);
           /* add one */
           }
           /* DtmfAtStartup          */
           *p++ = (short)dtmfAtStartup;
           /* J1kMode                */
           *p++ = (short)commonOperatingMode;
           /* DcaPolarity            */
           *p++ = (short)((DcadB2dB(commonDcaLevel) >=0) ? 1 : 0);
           /* DcaLevel               */
           *p++ = (short)((DcadB2dB(commonDcaLevel) >=0) ?
DcadB2dB(commonDcaLevel):   -DcadB2dB(commonDcaLevel));
           /* MicAttn                */
           *p++ = (short)commonMicAttn* 3;/* convert to dB before storing*/
           /* SpkAttn                */
           *p++ = (short)commonSpkAttn* 3;/* convert to dB before storing*/
           /* romDtmfGainPre         */
           *p++ = (short)commonDtmfGainPre;
           /* romSpkGainPre          */
           *p++ = (short)commonSpkGainPre;
           /* romSpkGainPost         */
           *p++ = (short)commonSpkGainPost;
           /* overrideEnable         */
           *p++ = (short)commonOverrideEnable;
           /* overrideThreshold */
```

```
                *p++ = (short)HexdB2absdB((HexdB)commonOverrideThreshold);
                /* MicMeterRiseTime          */
                *p++ = (short)HexdB2absdB((HexdB)mic.mtr.riseTime);
                /* MicMeterFallTime          */
                *p++ = (short)HexdB2absdB((HexdB)mic.mtr.fallTime);
                /* other required codes saved here */
                while (p < &pageArray[PageSize]) {
                        *p++ = 0;   /* fill out remainder of page */
                }
                if (err = WritePageToAtmel(&pageArray[0], (short *)&PromParams)) {
                        err    = atmelTimeOut;
                /* timeout error detected */
                }
                if (False == CompareRomToRam( &pageArray[0], (short
                *)&PromParams, PageSize)) {
                        err    = atmelBadCompare;/* copy didn't match */
                        }
                        return err;
}
/*********************************************************************/
/* Module: rewrite.c        */
/*                          */
/* routines to write to Atmel Flash*/
/*                          */
/* Rev 1.0 10 Feb 1995  DTR */
/*        Initial revision.      */
/*                          */
/*********************************************************************/
#include    "globals.h"
#include    "dtmf.h"
#define            PageSize    128
            Pragma_Sect_text
short       DetermineATT(short SCL)
{
            switch(SCL) {
                        case 0x0001:
                                return(0);     /* -0 dB */
                        case 0x0002:
                                return(1);     /* -6 dB */
                        case 0x0004:
                                return(2);     /* -12 dB */
                        case 0x0008:
                                return(3);     /* -18 dB */
                        case 0x0010:
                                return(4);     /* -24 dB */
                        case 0x0020:
                                return(5);     /* -30 dB */
                        case 0x0040:
                                return(6);     /* -36 dB */
                        case 0x0080:
                                return(7);     /* -42 dB */
                        default:
                                return(0);     /* 0 dB */
            }
}
Boolean CompareRomToRam( short *ramWhere, short * romWhere, short size)
{
            short i;
            while (size--) {
                        if ( ((0x00FF & *ramWhere) == (0x00FF &
FetchWordInRom(romWhere)) ) {
                                    ramWhere++;
                                    romWhere++;
                        }
                        else {
                                    return(False);
                        }
            }
            return(True);
}
            Pragma_Sect_text
Error WriteDefaultsToProm(void)
{
            short     pageArray[PageSize];
            short     i;
            Error     err;
            err = noErr;
            /* copy defaults into RAM */
            for (i=0; i<PageSize; i++) {
```

-continued

```
                pageArray[i] = FetchWordInRom((short *)&PromParams + i);
                /* fill in page */
        }
        if (err = WritePageToAtmel(&pageArray[0], (short *)&Defaults)) {
                err = atmelTimeOut; /* timeout error detected */
        }
        if (False == CompareRomToRam( &pageArray[0], (short *)&Defaults,
PageSize)) {
                err = atmelBadCompare;
        /* copy didn't match */
        }
        return err;
}
Error RestoreDefaultsFromProm(void)
{
        short    pageArray[PageSize];
        short    i;
        Error    err;
        err = noErr;
        i = FetchWordInRom((short *)&Defaults + 2);
        if (i > 2 || i <= 0)
                return;
        /* copy defaults into RAM */
        for (i=0; i<PageSize; i++) {
            pageArray[i] = FetchWordInRom((short *)&Defaults + i);
            /* fill in page */
        }
        /* don't reset the number of times the prom has been burned */
        pageArray[0] = 1 + FetchWordInRom((short *)&NumberOfBurns);
        /* store defaults to PROM */
        if (err = WritePageToAtmel(&pageArray[0], (short *)&PromParams)) {
                err = atmelTimeOut; /* timeout error detected */
        }
        /* verify write to PROM */
        if (False == CompareRomToRam( &pageArray[0], (short
*)&PromParams, PageSize)) {
                err = atmelBadCompare;
        /* copy didn't match */
        }
        return err;
}
Error    PokeRomByte(ushort * pokeAddress, ushort pokeValue)
{
        ushort    pageArray[PageSize];
        ushort    i;
        ushort *  pageStart;
        ushort    pageIndex;
        Error     err;
        err = noErr;
        pageStart = (ushort *)(0xFF80 & (ushort)pokeAddress);
        /* mask out low seven bits, point to start of writable page */
        pageIndex = (ushort)pokeAddress - (ushort)pageStart;
        /* calculate the desired index into the page */
        /* copy defaults into RAM */
        for (i=0; i<PageSize; i++) {
            pageArray[i] = FetchWordInRom((short *)pageStart + i);
            /* copy in what was already there */
        }
        /* factor in our one new byte */
        pageArray[pageIndex] = pokeValue;
        /* store defaults to PROM */
        if (err = WritePageToAtmel((short *)&pageArray[0], (short *)pageStart))
{
                err = atmelTimeOut; /* timeout error detected */
        }
        /* verify write to PROM */
        if (False == CompareRomToRam((short *)&pageArray[0], (short
*)&PromParams, PageSize)) {
                err = atmelBadCompare;
        /* copy didn't match */
        }
        return err;
}
/**********************************************************************/
/* Module:   remote4.c    */
/* Examples of           */
/* Remote control for 4-key sequences*/
/*                        */
/**********************************************************************/
```

-continued

```c
#ifdef Copyrights
static char copyrightNotice[ ] = "Copyright © 1994, 1995, JABRA Corporation";
#endif/* Copyrights */
#include "Globals.h"
#include "Dtmf.h"
            Pragma_Sect_text
void Process4CharCodes(void)
{
            switch (dtmfHistory[thirdMostRecent]) {
                case Three:
                    switch (dtmfHistory[secondMostRecent]) {
                        /* 34xx: INITSTR */
                        case Four:
                            commonINITSTR = Last2Digits( );
                            XmitHiBeep( );
                            break;
                        /* 36xx: commonDTMICON */
                        case Six:
                            commonDTMICON =
Last2DigitsToHexdB( );
                            XmitHiBeep( );
                            break;
                        default:
                            XmitErrorTone( );
                            break;
                    }
                    InitDtmfHistory( );
                    break;
                default:
                    XmitErrorTone( );
                    InitDtmfHistory( );
                    break;
            }
}
/*************************************************************/
/* Module:   rmt3.c       */
/* Examples of            */
/* Remote control for 3-key sequences*/
/*                        */
/*************************************************************/
#ifdef Copyrights
static char copyrightNotice[ ] = "Copyright © 1994, JABRA Corporation";
#endif/* Copyrights */
#include "Globals.h"
#include "Dtmf.h"
void Process3CharCodes(void)
{
            switch(dtmfHistory[secondMostRecent]) {
                case Zero:
                    switch(dtmfHistory[mostRecent]) {
                        case Zero:
                            switch(dtmfHistory[current]) {
                            /* 000: return control to user*/
                            case Zero:
                            remoteControlMode = Tuning
                            /* return back to tuning mode */
                            XmitTestTone( );
                            break;
                            /* 001: set sample rate to 8k */
                            case One:
                            if (PIUMULTI == commonActelType) {
                            dynSampleRate = kHz8;
                            XmitHiBeep( );
                            }
                            else {
                            XmitErrorTone( );
                            }
                            break;
                            /* 002: set sample rate to 10k */
                            case Two:
                            if (PIUMULTI == commonActelType) {
                            dynSampleRate = kHz10;
                            XmitHiBeep( );
                            }
                            else {
                            XmitErrorTone( );
                            }
                            break;
                            /* 003: set sample rate to 11k */
```

-continued

```
                                case Three:
                                    if (PIUMULTI == commonActelType) {
                                    dynSampleRate = kHz11;
                                    XmitHiBeep( );
                                    }
                                    else {
                                    XmitErrorTone( );
                                    }
                                    break;
                                    /* 004: set sample rate to 13k */
                                case Four:
                                    if (PIUMULTI == commonActelType) {
                                    dynSampleRate = kHz13;
                                    XmitHiBeep( );
                                    }
                                    else {
                                    XmitErrorTone( );
                                    }
                                    break;
                                default;
                                    XmitErrorTone( );
                                    break;
                                }
                                InitDtmfHistory( );
                                break;
                            }
                        default:
                            break;
                        }
                    break;
                case One:
                    switch(dtmfHistory[mostRecent]) {
                        case Zero:
                            switch(dtmfHistory[current]) {
                                case Zero:
                                break;
                                default:
                                break;
                            }
                        default:
                            break;
                        }
                        break;
                default:
                    XmitErrorTone( );
                    InitDtmfHistory( );
                    break;
            }
}
/*******************************************************************/
/* Module:   remote.c         */
/*                            */
/* Remote control DTMF decoding   */
/*                            */
/* Rev 1.0   21 Jan 1994   DTR     */
/*           Initial revision.     */
/*           Added ProcessMeterLEDs to Wait loop 4-24-95 Med*/
/*                            */
/*******************************************************************/
#ifdef Copyrights
static char copyrightNotice[ ] = "Copyright © 1994, JABRA Corporation";
#endif /* Copyrights */
#include "Globals.h"
#include "Dtmf.h"
#define HoldDuration    1500     /* number of milliseconds for a
long-duration hold rather than a 50 millisecond tap */
            Pragma_Sect_text
void Wait(Time milliseconds)    /* up to about 8 secs @ 8k, 4 secs @ 16k */
{
#if !Sim    /* not much need for delays like this in the simulator */
            Time    countdown;
            countdown = Msecs2Samples(milliseconds, commonSampleRate);
            if (Zero == countdown)
                    return;
DelayLoop:
            /* this is like a mini event-loop */
            if (--countdown) {
                    ProcessMeterLeds( );
                    ToggleWatchdog( );
```

-continued

```
                Idle( );
                goto DelayLoop;
        }
#endif /* Sim */
}
#if UseForDebugging
        Pragma_Sect_text2
void RomToggleWatchdog(void)
{       /* version of ToggleWatchdog compiled into ROM */
        /* for use before Ram code is initialized */
        actelShadow = (leds & ledOnMask) | (( ledOffMask & actelShadow ) ^
                0x0001 );
        SetActel(actelShadow);
}
void Delay(long milliseconds)
{
        /* since Wait( ) only works if the interrupts are turned on, */
        /* Delay works if the interrupts are turn off */
        long i;
        RomToggleWatchdog( );
#if !Sim
        for (i=0; i<milliseconds; i++) {
                asm (" rptz    #20000");
                asm ("                  nop");
        }
#endif /* !Sim */
}
void LedCountdown(void)
{
        leds = xxxx;
        Delay(200);
        leds = xxxo;
        Delay(200);
        leds = xxoo;
        Delay(200);
        leds = xooo;
        Delay(200);
        leds = oooo;
        Delay(200);
}
void LedCountup(void)
{
        leds = xxxx;
        Delay(200);
        leds = oxxx;
        Delay(200);
        leds = ooxx;
        Delay(200);
        leds = ooox;
        Delay(200);
        leds = oooo;
        Delay(200);
}
void LedFlash(void)
{
        leds = xxxx;
        Delay(200);
        leds = oxxo;
        Delay(200);
        leds = xoox;
        Delay(200);
        leds = oxxo;
        Delay(200);
        leds = oooo;
        Delay(200);
}
void LedFlash1(void)
{
        leds = oooo;
        Delay(200);
        leds = ooox;
        Delay(200);
        leds = oooo;
        Delay(200);
        leds = ooox;
        Delay(200);
        leds = oooo;
        Delay(200);
}
```

-continued

```
void LedFlash2(void)
{
        leds = oooo;
        Delay(200);
        leds = ooxx;
        Delay(200);
        leds = xxoo;
        Delay(200);
        leds = ooxx;
        Delay(200);
        leds = oooo;
        Delay(200);
}
#endif /* UseForDebugging */
void XmitSetOfFour(void)
{
        XmitHitBeep( );
        Wait(125);
        XmitBeepTone( );
        Wait(125);
        XmitBeepTone( );
        Wait(125);
        XmitBeepTone( );
        Wait(125);
}
        Pragma_Sect_text
void XmitVersionNumber(void)
{
        ushort versionNum;
        versionNum = FetchWordInRom((short *)&VersionNumber);
        Wait(100);
        XmitDtmfTone((versionNum & 0xF000)>>12);
        Wait(150);
        XmitDtmfTone((versionNum & 0x0F00)>>8);
        Wait(150);
        XmitDtmfTone((versionNum & 0x00F0)>>4);
        Wait(150);
        XmitDtmfTone(versionNum & 0x000F);
        Wait(150);
}
void XmitWordValue(ushort theWord)
{
        ushort digit;
        if (theWord >= 10000) {
                digit = theWord/10000;
                theWord -= digit * 10000;
                XmitDtmfTone(digit);
        }
        else {
                XmitDtmfTone(Zero);
        }
        Wait(150);
        if (theWord >= 1000) {
                digit = theWord/1000;
                theWord -= digit * 1000;
                XmitDtmfTone(digit);
        }
        else {
                XmitDtmfTone(Zero);
        }
        Wait(150);
        if (theWord >= 100) {
                digit = theWord/100;
                theWord -= digit * 100;
                XmitDtmfTone(digit);
        }
        else {
                XmitDtmfTone(Zero);
        }
        Wait(150);
        if (theWord >= 10) {
                digit = theWord/10;
                theWord -= digit * 10;
                XmitDtmfTone(digit);
        }
        else {
                XmitDtmfTone(Zero);
        }
        Wait(150);
```

```
            XmitDtmfTone(theWord);
}
void XmitDtmfWave(void)
{
        Wait(50);
        PlayMicSnd(&Dtmf1Start, &DtmfPoundEnd, 0,
FetchWordInRom((short *)&pinkToneLevel));
}
void PlayDtmfWave(void)
{
        Wait(50);
        PlaySpkSnd(&Dtmf1Start, &DtmfPoundEnd, 0,
FetchWordInRom((short *)&pinkToneLevel));
}
        Pragma_Sect_text
void XmitPinkTone(void)
{
        PlayMicSnd(&PinkToneStart, &PinkToneEnd, 5,
FetchWordInRom((short *)&pinkToneLevel));
}
void XmitTestTone(void)
{
        PlayMicSnd(testToneStart, testToneEnd, testToneLoops, testToneLevel);
}
void XmitLoBeep(void)
{
        PlayMicSnd(&Sine500Start, &Sine500End, 13,
FetchWordInRom((short *)&sineToneLevel));
}
void XmitBeepTone(void)
{
        PlayMicSnd(&Sine1kStart, &Sine1kEnd, 26,
FetchWordInRom((short *)&sineToneLevel));
}
void XmitHiBeep(void)
{
        PlayMicSnd(&Sine2kStart, &Sine2kEnd, 52, FetchWordInRom((short
*)&sineToneLevel));
}
void PlayWaitingTone(void)
{
        Wait(60);
        PlaySpkSnd(&Sine1kStart, &Sine1kEnd, 26, minus40dB);
        Wait(600);
        PlaySpkSnd(&Sine2kStart, &Sine2kEnd, 52, minus40dB);
        Wait(600);
        PlaySpkSnd(&Sine1kStart, &Sine1kEnd, 26, minus40dB);
        Wait(600);
        PlaySpkSnd(&Sine500Start, &Sine500End, 13, minus36dB);
        Wait(600);
        PlaySpkSnd(&Sine1kStart, &Sine1kEnd, 26, minus40dB);
        Wait(600);
        PlaySpkSnd(&Sine2kStart, &Sine2kEnd, 52, minus40dB);
        Wait(580);
        PlaySpkSnd(&Sine500Start, &Sine500End, 13, minus36dB);
}
void XmitExpertTone(void)
{
        Wait(60);
        PlayMicSnd(&Sine1kStart, &Sine1kEnd, 26,
FetchWordInRom((short *)&sineToneLevel));
        Wait(200);
        PlayMicSnd(&Sine2kStart, &Sine2kEnd, 52,
FetchWordInRom((short *)&sineToneLevel));
        Wait(100);
        PlayMicSnd(&Sine2kStart, &Sine2kEnd, 52,
FetchWordInRom((short *)&sineToneLevel));
        Wait(100);
        PlayMicSnd(&Sine1kStart, &Sine1kEnd, 26,
FetchWordInRom((short *)&sineToneLevel));
}
void PlayExpertTone(void)
{
        Wait(60);
        PlaySpkSnd(&Sine1kStart, &Sine1kEnd, 26,
FetchWordInRom((short *)&sineToneLevel));
        Wait(200);
        PlaySpkSnd(&Sine2kStart, &Sine2kEnd, 52,
FetchWordInRom((short *)&sineToneLevel));
```

```
            Wait(100);
            PlaySpkSnd(&Sine2kStart, &Sine2kEnd, 52,
FetchWordInRom((short *)&sineToneLevel));
            Wait(100);
            PlaySpkSnd(&Sine1kStart, &Sine1kEnd, 26,
FetchWordInRom((short *)&sineToneLevel));
}
void XmitDtmfTone(DtmfState tone)
{
            if (Listenable == responseType) {
                XmitListenableNumber(tone);
            }
            else {
                switch(tone) {
                case Zero:
                    PlayMicSnd(&Dtmf0Start, &Dtmf0End, 0,
FetchWordInRom((short *)&pinkToneLevel));
                    break;
                case One:
                    PlayMicSnd(&Dtmf1Start, &Dtmf1End, 0,
FetchWordInRom((short *)&pinkToneLevel));
                    break;
                case Two:
                    PlayMicSnd(&Dtmf2Start, &Dtmf2End, 0,
FetchWordInRom((short *)&pinkToneLevel));
                    break;
                case Three:
                    PlayMicSnd(&Dtmf3Start, &Dtmf3End, 0,
FetchWordInRom((short *)&pinkToneLevel));
                    break;
                case Four:
                    PlayMicSnd(&Dtmf4Start, &Dtmf4End, 0,
FetchWordInRom((short *)&pinkToneLevel));
                    break;
                case Five:
                    PlayMicSnd(&Dtmf5Start, &Dtmf5End, 0,
FetchWordInRom((short *)&pinkToneLevel));
                    break;
                case Six:
                    PlayMicSnd(&Dtmf6Start, &Dtmf6End, 0,
FetchWordInRom((short *)&pinkToneLevel));
                    break;
                case Seven:
                    PlayMicSnd(&Dtmf7Start, &Dtmf7End, 0,
FetchWordInRom((short *)&pinkToneLevel));
                    break;
                case Eight:
                    PlayMicSnd(&Dtmf8Start, &Dtmf8End, 0,
FetchWordInRom((short *)&pinkToneLevel));
                    break;
                case Nine:
                    PlayMicSnd(&Dtmf9Start, &Dtmf9End, 0,
FetchWordInRom((short *)&pinkToneLevel));
                    break;
                case Star:
                    PlayMicSnd(&DtmfStarStart, &DtmfStarEnd, 0,
FetchWordInRom((short *)&pinkToneLevel));
                    break;
                case Pound:
                    PlayMicSnd(&DtmfPoundStart, &DtmfPoundEnd, 0,
FetchWordInRom((short *)&pinkToneLevel));
                    break;
                default:
                    XmitErrorTone( );
                    break;
                }
            }
}
void XmitListenableNumber(DtmfState code)
{
            switch(code) {
                case 0:
                    XmitBeepTone( );
                    Wait(80);
                    XmitBeepTone( );
                    Wait(80);
                    break;
                case 1:
                    XmitHiBeep( );
```

-continued

```
                Wait(125);
                break;
            case 2:
                XmitHiBeep( );
                Wait(125);
                XmitBeepTone( );
                Wait(125);
                break;
            case 3:
                XmitHiBeep( );
                Wait(125);
                XmitBeepTone( );
                Wait(125);
                XmitBeepTone( );
                Wait(125);
                break;
            case 4:
                XmitSetOfFour( );
                break;
            case 5:
                XmitSetOfFour( );
                XmitHiBeep( );
                Wait(125);
                break;
            case 6:
                XmitSetOfFour( );
                XmitHiBeep( );
                Wait(125);
                XmitBeepTone( );
                Wait(125);
                break;
            case 7:
                XmitSetOfFour( );
                XmitHiBeep( );
                Wait(125);
                XmitBeepTone( );
                Wait(125);
                XmitBeepTone( );
                Wait(125);
                break;
            case 8:
                XmitSetOfFour( );
                XmitSetOfFour( );
                break;
            case 9:
                XmitSetOfFour( );
                XmitSetOfFour( );
                XmitHiBeep( );
                Wait(125);
                break;
        }
        Wait(600);    /* let human digest the number */
}
void XmitDcaLevel(DcadB level)
{
        DtmfState firstDigit;
        DtmfState secondDigit;
        if (level > dcaUnityGain) {
            firstDigit = Nine;
            secondDigit = DcadB2dB(level);
        /* +1 thru +6 are sent as 91 thru 96 */
        }
        else {    /* 0 thru minus66 end up here */
            firstDigit = abs(DcadB2dB(level))/10;
            secondDigit = abs(DcadB2dB(level))%10;
        }
        Wait(100);
        XmitDtmfTone(firstDigit);
        Wait(500);
        XmitDtmfTone(secondDigit);
        Wait(100);
}
void XmitSpkAttLevel(CombodB level)
{
        /* the speaker attenuation has 8 units of attenuation: steps 0 thru 7 */
        /* we transmit this number directly in a single digit. */
        Wait(200);
        XmitDtmfTone(level);
}
```

-continued

```
void XmitNC2Status(void)
{
        /* */
        /* we transmit this number directly in a single digit. */
        Wait(200);
        XmitDtmfTone( commonOperatingMode == eModeNC1 ? Four:
(NC2HiLo ? Six : Five ));
}
void XmitJ1kStatus(void)
{
        XmitVersionNumber( );
        XmitDcaLevel(commonDcaLevel);
        XmitNC2Status( );
}
void XmitNC2HiTone(void)
{
        PlayMicSnd(&Sine2kStart, &Sine2kEnd, 52,
FetchWordInRom((short *)&sineToneLevel));
        Wait(120);
        PlayMicSnd(&Sine2kStart, &Sine2kEnd, 52,
FetchWordInRom((short *)&sineToneLevel));
}
void XmitNC2LoTone(void)
{
        PlayMicSnd(&Sine1kStart, &Sine1kEnd, 26,
FetchWordInRom((short *)&sineToneLevel));
        Wait(120);
        PlayMicSnd(&Sine1kStart, &Sine1kEnd, 26, FetchWordInRom((short
*)&sineToneLevel));
}
void XmitNC1Tone(void)
{
        PlayMicSnd(&Sine500Start, &Sine500End, 13, −6 +
FetchWordInRom((short *)&sineToneLevel));
        Wait(120);
        PlayMicSnd(&Sine500Start, &Sine500End, 13, −6 +
FetchWordInRom((short *)&sineToneLevel));
}
void XmitErrorTone(void)
{
        PlayMicSnd(&PinkTone3Qtr, &SilenceEnd, 3, minus10dB);
}
void PlayErrorTone(void)
{
        PlaySpkSnd(&PinkTone3Qtr, &SilenceEnd, 3, minus10dB);
}
void XmitOverrideTone(void)
{
        PlayMicSnd(&PinkTone3Qtr, &SilenceEnd, 5, unityGain);
        #if Lab
            PlaySpkSnd(&PinkTone3Qtr, &SilenceEnd, 5, unitGain);
        #endif/* Lab */
        if (eModeNC2 != commonOperatingMode) {
        /* interrupts are turned off if we're coming from NC2 */
            Wait(338);   /* override tone is 337 msecs long */
        }
}
void AdjustDca(dB gainChange)
{
        commonDcaLevel = dB2DcadB(gainChange +
DcadB2dB(commonDcaLevel));
}
void EnableRemoteControl(void)
{
        remoteControl = True;
        SetSampleRate(kHz8);
        micMode = Mute;
        spkMode = Thru;
        remoteControlMode = Tuning;
        commonShortOverrideTimeOut = 0;
        InitSpkInFifo(SpkInDelay, SpkInPreQ);
        /* reset the dtmf fifo */
        InitDtmfHistory( );
}
void ActivateRemoteControl(void)
{
        EnableRemoteControl( );
        spkMode = Mute;
        XmitOverrideTone( ); /* this routine blocks until sound is finished */
```

```
                remoteControlMode = NeedCode;
                overrideCountdown = commonOverrideCodeTime;
                /* how long do we have to enter code */
}
void DisableRemoteControl(Boolean playSound)
{
                remoteControl = False;
                remoteControlMode = Tuning;
                /* commonShortOverrideTimeOut is decremented in 5 msec intervals, or
200 Hz */
                /* when it gets to zero, then the long override duration is required */
                commonShortOverrideTimeOut = 200 * FetchWordInRom((short
*)&shortOverrideTimeOut);
                if (playSound) {
                    PlayMicSnd(&JabraSndStart, &JabraSndEnd, 0, minus9dB);
                    PlaySpkSnd(&JabraSndStart, &JabraSndEnd, 0, minus15dB);
                    singOnKey = True;
                }
                /* use sample rate set in prm.a or set by DTMF */
                /* this only makes a difference when using multi-rate actels */
                SetSampleRate(dynSampleRate);
                micMode = (eModeInOut == commonOperatingMode) ? Thru :
dynMicMode;
                if (PIUMULTI == commonActelType && kHz8 < commonSampleRate) {
                    spkMode = Thru;
                }
                else {
                    /* */
                    spkMode = (eModeNC1 == commonOperatingMode) ?
dynSpkMode : Thru;
                }
                mic.mtr.maxLevel = 99;
                spk.mtr.maxLevel = 99;
}
void DisableOverrideEverAfter(void)
{
                commonOverrideEnable = False;
}
void ReenableOverrideAfterAll(void)
{
                commonOverrideEnable = True;
}
HexdB Last2DigitsToHexdB(void)
{
                return (dB2HexdB(-(dtmfHistory[mostRecent]*10 +
dtmfHistory[current])));
}
ushort Last2Digits(void)
{
                return (dtmfHistory[mostRecent]*10 + dtmfHistory[current]);
}
ushort * CalculateAddress(void)
{
                /* convert 5-digit decimal number into hex address */
                ushort result;
                result = 10000 * dtmfHistory[fourthMostRecent];
                result += 1000 * dtmfHistory[thirdMostRecent];
                result += 100 * dtmfHistory[secondMostRecent];
                result += 10 * dtmfHistory[mostRecent];
                result += dtmfHistory[current];
                return((ushort *)result);
}
void OutputAddressContents(ushort * address)
{
                extern ushort saram_start;
                extern ushort saram_end;
                register ushort a;
                /* audibly output value of word at RAM address */
                /* first make sure we're reading from valid data RAM */
                a = (ushort)address;
                if ((a >= (short)&saram_start && a <= (short)&saram_end)
                || (a >= 0x60 && a <= 0x7F)
                || (a >= 0x100 && a <= 0x4FF)) {
                    /* in valid data ram range */
                    XmitWordValue(*address);
                }
                else {
                    XmitErrorTone( );
                }
```

-continued

```
}
void RemoteControl(register DtmfState state, ushort prevDuration)
{
            ushort i;
            ushort dtmfOverrideCode;
            ushort pokeValue;
            dtmfOverrideCode = FetchWordInRom((short *)&overrideCode);
            /* duration is in # of chunks */
            /* convert into milliseconds */
            if (prevDuration <= 65535/5) {
                prevDuration *= 5;
            }
            else {
                prevDuration = 65535/5;
            /* make sure we don't overflow a ushort */
            }
#if DtmfLeds
            /* these are always displayed, regardless of commonLedMode */
            switch (state) {
                case One:
                    leds = ooox;
                    break;
                case Two:
                    leds = ooxo;
                    break;
                case Three:
                    leds = ooxx;
                    break;
                case Four:
                    leds = oxoo;
                    break;
                case Five:
                    leds = oxox;
                    break;
                case Six:
                    leds = oxxo;
                    break;
                case Seven:
                    leds = oxxx;
                    break;
                case Eight:
                    leds = xooo;
                    break;
                case Nine:
                    leds = xoox;
                    break;
                case Zero:
                    leds = xoxo;
                    break;
                case Star:
                    leds = xoxx;
                    break;
                case Pound:
                    leds = xxoo;
                    break;
                case Ring:
                    leds = xxox;
                    break;
                case Busy:
                    leds = xxxo;
                    break;
                case DialTone:
                    leds = xxxx;
                    break;
                case Silence:
                    leds = oooo;
                    break;
                default
                    leds = oooo;
                    break;
            }
            #endif /* DtmfLeds */
            /* newest element is [0], oldest element is [HistorySize-1]*/
            /* age everything by one DTMF state by shifting down the line, bucket
brigade style */
            if (Silence != state) { /* only store non-silence characters to DTMF
history */
                for (i= HistorySize-1; i>0; i--) {
                    dtmfHistory[i] = dtmfHistory[i-1];
```

```
            }
            dtmfHistory[current] = state;
        }
        /* the pound the star keys interact adversely with PBX and call control */
        /* systems, especially when they're held down for a while */
        /* We now use the 8 key to switch modes instead of the pound key */
        /* and the pound key itself is used to toggle the speaker mute in tuning
mode */
        /* and is used as a clear line key in expert mode */
        /* Tuning keys are activated just after transitioning to silence */
        if (Tuning == remoteControlMode && Silence == state) {
            ProcessTuning(state, prevDuration);
        }
        else
        /* get the value stored in data space (typically RAM) at the specified
address */
        if (DataAddress == remoteControlMode && Silence == state) {
            if (Unknown != dtmfHistory[fourthMostRecent] && Unknown ==
dtmfHistory[fifthMostRecent]) {
                /* response for the 5th digit of the address */
                Wait(20);
                XmitDtmfTone(dtmfHistory[current]);
                Wait(500);
                OutputAddressContents(CalculateAddress( ));
                remoteControlMode = Expert;
                InitDtmfHistory( );
            }
            else {
                /* response for the first 4 digits of the address */
                Wait(20);
                XmitDtmfTone(dtmfHistory[current]);
                Wait(200);
            }
        }
        else
        /* get the value stored in program space (typically ROM) at the specified
address */
        if (ProgAddress == remoteControlMode && Silence == state) {
            if (Unknown != dtmfHistory[fourthMostRecent] && Unknown ==
dtmfHistory[fifthMostRecent]) {
                /* response for the 5th digit of the address */
                Wait(20);
                XmitDtmfTone(dtmfHistory[current]);
                Wait(500);
                /* output value of Prog rom at this address*/
                i = (ushort)FetchWordInRom((short *)CalculateAddress( ));
                OutputAddressContents(&i);
                remoteControlMode = Expert;
                InitDtmfHistory( );
            }
            else {
                /* response for the first 4 digits of the address */
                Wait(20);
                XmitDtmfTone(dtmfHistory[current]);
                Wait(200);
            }
        }
        else
        /* poke a 5-digit value into PROM */
        if (PokeValue == remoteControlMode && Silence == state) {
            if (Unknown != dtmfHistory[fourthMostRecent] && Unknown ==
dtmfHistory[fifthMostRecent]) {
                /* response for the 5th digit of the address */
                Wait(20);
                XmitDtmfTone(dtmfHistory[current]);
                Wait(500);
                poke Value = (ushort)CalculateAddress( );
            /* it's really the value, not the address */
                if (noErr != PokeRomByte(pokeAddress, pokeValue)) {
                    XmitErrorTone( );
                }
                else {
                    /* output value of Prog rom at this address*/
                    i = (ushort)FetchWordInRom((short
*)CalculateAddress( ));
                    OutputAddressContents(&i);
                }
                remoteControlMode = Expert;
                InitDtmfHistory( );
```

-continued

```
                }
                else {
                    /* response for the first 4 digits of the value */
                    Wait(20);
                    XmitDtmfTone(dtmfHistory[current]);
                    Wait(200);
                }
            }
        }
        else
        /* get the address to poke a 5-digit value into */
        if (PokeAddress == remoteControlMode && Silence == state) {
            if (Unknown != dtmfHistory[fourthMostRecent] && Unknown ==
dtmfHistory[fifthMostRecent]) {
                /* response for the 5th digit of the address */
                Wait(20);
                XmitDtmfTone(dtmfHistory[current]);
                Wait(500);
                XmitHiBeep( );
                Wait(200);
                XmitHiBeep( );
                /* output value of Prog rom at this address*/
                pokeAddress = CalculateAddress( );
                remoteControlMode = PokeValue;
                InitDtmfHistory( );
            }
            else {
                /* response for the first 4 digits of the address */
                Wait(20);
                XmitDtmfTone(dtmfHistory[current]);
                Wait(200);
            }
        }
        else
        /* Parametric mode requires sequences of 3 or 4 keys */
        /* Parametric keys are activated just after transitioning to silence */
        if (Expert == remoteControlMode && Silence == state) {
            Wait(20);
            /*XmitDtmfTone(dtmfHistory[current]);*/
            XmitBeepTone( );
            if (Pound == dtmfHistory[current]) {
                /* clear current entry */
                InitDtmfHistory( );
                XmitHiBeep( );
                Wait(80);
                XmitHiBeep( );
                if (DataAddress == remoteControlMode
                  || ProgAddress == remoteControlMode) {
                    remoteControlMode = Expert;
                    XmitErrorTone( );
                }
                return;
            }
            /*********** Three character codes: ************/
            /* the thirdMostRecent must be unknown */
            /* hitting the pound key resets the DTMF history */
            if ((Unknown != dtmfHistory[secondMostRecent]) && (Unknown
== dtmfHistory[thirdMostRecent])) {
                Process3CharCodes( );
            }
            else
            /*********** Four character codes: ************/
            if ((Unknown != dtmfHistory[thirdMostRecent]) && (Unknown
== dtmfHistory[fourthMostRecent])) {
                Process4CharCodes( );
            }
        }
        else
        /* if override key is zero, then no security code required */
        if (NeedCode == remoteControlMode && 0x0000 == dtmfOverrideCode)
{
            remoteControlMode = Tuning;
            #if Lab
                spkMode = Thru;
                XmitDtmfWave( );
                remoteControlMode = Expert;
            #else
                XmitPinkTone( );
                PlayWaitingTone( );
            spkMode = Mute;
```

-continued

```
            #endif /* Lab */
            InitDtmfHistory( );
            return;
        }
        else
/*NeedCode mode looks for the secret decoder ring code and nothing else*/
            if (NeedCode == remoteControlMode && Silence == state) {
                state = dtmfHistory[current];
        /* use the state just prior to silence */
                XmitBeepTone( );/* key click response during security sessions */
                if ((((dtmfOverrideCode & 0x0F00)>>8) ==
dtmfHistory[secondMostRecent]) {
                    if ((((dtmfOverrideCode & 0x00F0)>>4) ==
dtmfHistory[mostRecent]) {
                        if ((dtmfOverrideCode & 0x000F) ==
dtmfHistory[current]) {
                            remoteControlMode = Tuning;
                            spkMode = Mute;
                            XmitPinkTone( );
                            InitDtmfHistory( );
                            PlayWaitingTone( );
                        }
                    }
                }
            }
}
void ProcessTuning(register DtmfState state, ushort prevDuration) {
        switch(dtmfHistory[current]) {
            case Zero:
                DisableRemoteControl(True);
            /* play sound and return control to user */
                InitDtmfHistory( );
                break;
            case One:
                if (commonDcaLevel > dcaMinus36dB)
        {
                    AdjustDca(-3);
                    XmitTestTone( );
                }
                else {
                    XmitErrorTone( );
                }
                InitDtmfHistory( );
                break;
            case Two:
                if (prevDuration < HoldDuration) {
                    XmitTestTone( );
                }
                else {
                    /* change frequency/type of test tone */
                    /* no adjustment of DCA */
                    if (testToneStart == &PinkToneStart) {;
                        testToneStart = &Sine500Start;
                        testToneEnd = &Sine500End;;
                        testToneLoops = 800;
                    }
                    else
                    if (testToneStart == &Sine500Start) {;
                        testToneStart = &Sine1kStart;
                        testToneEnd = &Sine1kEnd;;
                        testToneLoops = 1600;
                    }
                    else
                    if (testToneStart == &Sine1kStart) {;
                        testToneStart = &Sine2kStart;
                        testToneEnd = &Sine2kEnd;;
                        testToneLoops = 3200;
                    }
                    else   /* default */
                    if (testToneStart == &Sine2kStart) {;
                        testToneStart = &PinkToneStart;
                        testToneEnd = &PinkToneEnd;;
                        testToneLoops = 2;
                    }
                    XmitTestTone( );
                }
                InitDtmfHistory( );
                break;
            case Three:
```

-continued

```
        if (commonDcaLevel < dcaPlus6dB) {
            AdjustDca(+3);
            XmitTestTone( );
        }
        else {
            XmitErrorTone( );
        }
        InitDtmfHistory( );
        break;
/* */
    case Four:
        commonOperatingMode = eModeNC1;
        XmitNC1Tone( );
        InitDtmfHistory( );
        break;
/* */
    case Five:
        commonOperatingMode = eModeNC2;
        XmitNC2LoTone( );
        InitDtmfHistory( );
        break;
/* */
    case Six:
        commonOperatingMode = eModeNC2;
        XmitNC2HiTone( );
        InitDtmfHistory( );
        break;
/* send out version number */
    case Seven:
        if (prevDuration > HoldDuration) {
            responseType = Listenable;
        }
        else {
            responseType = Dtmf;
        }
        XmitJ1kStatus( );
        InitDtmfHistory( );
        break;
    case Eight:
        remoteControlMode = Expert;
        XmitDtmfWave( );
        InitDtmfHistory( );
        break;
/* burn in settings without going to advanced mode */
    case Nine:
        /* False therefore no DTMF at startup */
        switch(RewriteParams(False)) {
            case noErr:
                XmitExpertTone( );
                break;
            case atmelTimeOut:
                XmitErrorTone( );
                Wait(500);
                XmitErrorTone( );
                break;
            case atmelBadCompare:
                XmitErrorTone( );
                Wait(500);
                XmitErrorTone( );
                Wait(500);
                XmitErrorTone( );
                break;
            default:
                XmitErrorTone( );
                break;
        }
        break;
    case Pound:
/* pound key toggles spk mute */
        if (spkMode == Mute) {
            XmitLoBeep( );
            Wait(100);
/* let the operator hear the beep, but not the user */
            spkMode = Thru;
        }
        else {
            spkMode = Mute;
            XmitHiBeep( );
        }
```

```
                    InitDtmfHistory( );
                    break;
        }
}
/*********************************************************************/
/* Module: Metr.c            */
/*                           */
/* metering and signal detection  */
/*                           */
/* Rev 1.0  15 Nov 1994  DTR  */
/*          Initial revision.  */
/*                           */
/*********************************************************************/
#include "globals.h"
            Pragma_Sect_ramcode
MeterPtr tmpMtr;
Speech tmpIn;
dB ProcessMeter(MeterPtr mtr, Speech input)
{
            tmpMtr = mtr;
            tmpIn = input;
            asm(" .global_ProcessPeakMeter");
            asm(" .global_tmpMtr");
            asm(" .global_tmpIn");
            asm    ("      larp AR3");
            asm    ("      ldpk _tmpMtr");
            asm    ("      lar  AR3,_tmpMtr");
            asm    ("      ldpk _tmpIn");
            asm    ("      lacl _tmpIn");
            asm    ("      call _ProcessPeakMeter");
}
/*
            File:       DTMF2.c
            Contains:   more Routines For analyzing DTMF sound samples
            Copyright:  =| 1994, JABRA Corporation, all rights reserved worldwide.
            This file contains DTMF detection state machine & init code.
*/
#include "globals.h"
#include "dtmf.h"
/********************************************************************
*       processChunkState(DtmfParamsPtr dtmfPtr)
*       If the state changes and remains constant for MinStateDuration number
*       of chunks, processChunkState( ) will usually call
dtmfPtr->callBackRoutine( )
*       passing the state to the callBackRoutine. However, it looks for patterns of
*       pulsing ringing or busy tones and will not repeat calls the callBackRoutine
*       in the case of ringing or busy. (It DOES call the callBackRoutine ONCE in
*       the cases of ringing or busy.
*       Note! Does not call UNDETERMINED (although detects it).
********************************************************************/
            Pragma_Sect_text2
void ProcessChunkState( register DtmfParamsPtr dtmfPtr)
{
            if (dtmfPtr->stateDuration == MinStateDuration && dtmfPtr->state !=
Unknown){
#if UsingAllFilters
                        if ( (
                                    !(dtmfPtr->state == Busy &&
                                        dtmfPtr->previous_state == Silence &&
                                        dtmfPtr->previous_previous_state == Busy)
                        &&      !(dtmfPtr->state == Silence &&
                                        dtmfPtr->previous_state == Busy &&
                                        dtmfPtr->previous_previous_state == Silence)
                        &&      !(dtmfPtr->state == Ring &&
                                        dtmfPtr->previous_state == Silence &&
                                        dtmfPtr->previous_previous_state == Ring)
                        &&      !(dtmfPtr->state == Silence &&
                                        dtmfPtr->previous_state == Ring &&
                                        dtmfPtr->previous_previous_state == Silence) )
                        ||
                                    (dtmfPtr->state == Silence &&
                                        dtmfPtr->stateDuration == SilenceTimeout) ){
                                    /* The state has officially changed */
                                    /* take action */
                                    if(dtmfPtr->callBackRoutine!=0){
(*(dtmfPtr->callBackRoutine))(dtmfPtr->state, dtmfPtr->prevDuration);
                                    }
                        }
#else       /* not UsingAllFilters */
```

-continued

```
                if(dtmfPtr->callBackRoutine!=0){
            (*(dtmfPtr->callBackRoutine))(dtmfPtr->state, dtmfPtr->prevDuration);
                }
#endif
                dtmfPtr->previous_previous_state = dtmfPtr->previous_state;
                dtmfPtr->previous_state = dtmfPtr->state;
            }
    }
                Pragma_Sect_text2
    void InitDtmf( register DtmfParamsPtr dtmf )
    {
                short i;
                if (0 == dtmf) {
                    return;
                }
                dtmf->state = Unknown;
                dtmf->stateDuration = 0;
                dtmf->prevDuration = 0;
                dtmf->previous_state = Unknown;
                dtmf->previous_previous_state = Unknown;
                dtmf->inputPtr = 0;
                dtmf->callBackRoutine = RoutineControl;
                dtmf->inputGain = 32767;
                dtmf->inputDiffState = 0;
                dtmf->inputIntState = 0;
    InitMeter(&dtmf->dtmfMeter, (Rate)FetchHexdBInRom(&DtmfMeterRiseTime), (Rate)Fe
    tchHexdBInRom(&DtmfMeterFallTime));
                /* dtmf recognition is always as 7812.5 hz sample rate */
    #if (False==Sim)      /* simulator uses pre-calculated coeffs to save time */
    IntDtmfFilter(dtmf->filterPtr[0]=&filter0, (FilterParmsPtr)&DtmfFilterParms0, kHz8);
    IntDtmfFilter(dtmf->filterPtr[1]=&filter1, (FilterParmsPtr)&DtmfFilterParms1, kHz8);
    IntDtmfFilter(dtmf->filterPtr[2]=&filter2, (FilterParmsPtr)&DtmfFilterParms2, kHz8);
    IntDtmfFilter(dtmf->filterPtr[3]=&filter3, (FilterParmsPtr)&DtmfFilterParms3, kHz8);
    IntDtmfFilter(dtmf->filterPtr[4]=&filter4, (FilterParmsPtr)&DtmfFilterParms4, kHz8);
    IntDtmfFilter(dtmf->filterPtr[5]=&filter5, (FilterParmsPtr)&DtmfFilterParms5, kHz8);
    IntDtmfFilter(dtmf->filterPtr[6]=&filter6, (FilterParmsPtr)&DtmfFilterParms6, kHz8);
    #if UsingAllFilters
    IntDtmfFilter(dtmf->filterPtr[7]=&filter7, (FilterParmsPtr)&DtmfFilterParms7, kHz8);
    IntDtmfFilter(dtmf->filterPtr[8]=&filter8, (FilterParmsPtr)&DtmfFilterParms8, kHz8);
    IntDtmfFilter(dtmf->filterPtr[9]=&filter9, (FilterParmsPtr)&DtmfFilterParms9, kHz8);
    IntDtmfFilter(dtmf->filterPtr[10]=&filter10, (FilterParmsPtr)&DtmfFilterParms10,
    kHz8);
    IntDtmfFilter(dtmf->filterPtr[11]=&filter11, (FilterParmsPtr)&DtmfFilterParms11,
    kHz8);
    #endif /* UsingAllFilters */
    #else
                /* sample rate = 7812.5, freq 697 Hz, gain = 40, bandwidth = .18 octaves,
    feedforward paramters have extra 6 dB */
                dtmf->filterPtr[0]     =&filter0;
                dtmf->filterPtr[0]->b2 =212;
                dtmf->filterPtr[0]->b1 =-553;
                dtmf->filterPtr[0]->b0 =441;
                dtmf->filterPtr[0]->a2 =16270;
                dtmf->filterPtr[0]->a1 =-27656;
                dtmf->filterPtr[0]->x2 =0;
                dtmf->filterPtr[0]->x1 =0;
                dtmf->filterPtr[0]->y2 =0;
                dtmf->filterPtr[0]->y1 =0;
                dtmf->filterPtr[0]->nrg =0L;
                /* sample rate = 7812.5,
                freq 770 Hz, gain = 40,
                bandwidth = .18
                octaves,
    feedforward parameters have extra 6 dB */
                dtmf->filterPtr[1]     =&filter1;
                dtmf->filterPtr[1]->b2 =200;
                dtmf->filterPtr[1]->b1 =-532;
                dtmf->filterPtr[1]->b0 =453;
                dtmf->filterPtr[1]->a2 =16258;
                dtmf->filterPtr[1]->a1 =-26580;
                dtmf->filterPtr[1]->x2 =0;
                dtmf->filterPtr[1]->x1 =0;
                dtmf->filterPtr[1]->y2 =0;
                dtmf->filterPtr[1]->y1 =0;
                dtmf->filterPtr[1]->nrg =0L;
                /* sample rate = 7812.5,
                freq 852 Hz, gain = 40,
                bandwidth = .144
                octaves,
```

-continued

```
feedforward paramters have extra 6 dB */
        dtmf->filterPtr[2]     =&filter2;
        dtmf->filterPtr[2]->b2  =215;
        dtmf->filterPtr[2]->b1  =-506;
        dtmf->filterPtr[2]->b0  =438;
        dtmf->filterPtr[2]->a2  =16272;
        dtmf->filterPtr[2]->a1  =-25285;
        dtmf->filterPtr[2]->x2  =0;
        dtmf->filterPtr[2]->x1  =0;
        dtmf->filterPtr[2]->y2  =0;
        dtmf->filterPtr[2]->y1  =0;
        dtmf->filterPtr[2]->nrg =0L;
        /* sample rate = 7812.5,
        freq 941 Hz, gain = 40,
        bandwidth = .144
        octaves,
feedforward paramters have extra 6 dB */
        dtmf->filterPtr[3]     =&filter3;
        dtmf->filterPtr[3]->b2  =203;
        dtmf->filterPtr[3]->b1  =-475;
        dtmf->filterPtr[3]->b0  =450;
        dtmf->filterPtr[3]->a2  =16261;
        dtmf->filterPtr[3]->a1  =-23734;
        dtmf->filterPtr[3]->x2  =0;
        dtmf->filterPtr[3]->x1  =0;
        dtmf->filterPtr[3]->y2  =0;
        dtmf->filterPtr[3]->y1  =0;
        dtmf->filterPtr[3]->nrg =0L;
        /* sample rate = 7812.5,
        freq 1209 Hz, gain =
        40, bandwidth = .144
octaves, feedforward paramters have extra 6 dB */
        dtmf->filterPtr[4]     =&filter4;
        dtmf->filterPtr[4]->b2  =168;
        dtmf->filterPtr[4]->b1  =-367;
        dtmf->filterPtr[4]->b0  =484;
        dtmf->filterPtr[4]->a2  =16226;
        dtmf->filterPtr[4]->a1  =-18371;
        dtmf->filterPtr[4]->x2  =0;
        dtmf->filterPtr[4]->x1  =0;
        dtmf->filterPtr[4]->y2  =0;
        dtmf->filterPtr[4]->y1  =0;
        dtmf->filterPtr[4]->nrg =0L;
        /* sample rate = 7812.5,
        freq 1336 Hz, gain =
        40, bandwidth = .18
        octaves,
feedforward paramters have extra 6 dB */
        dtmf->filterPtr[5]     =&filter5;
        dtmf->filterPtr[5]->b2  =107;
        dtmf->filterPtr[5]->b1  =-310;
        dtmf->filterPtr[5]->b0  =544;
        dtmf->filterPtr[5]->a2  =16166;
        dtmf->filterPtr[5]->a1  =-15500;
        dtmf->filterPtr[5]->x2  =0;
        dtmf->filterPtr[5]->x1  =0;
        dtmf->filterPtr[5]->y2  =0;
        dtmf->filterPtr[5]->y1  =0;
        dtmf->filterPtr[5]->nrg =0L;
        /* sample rate = 7812.5,
        freq 1477 Hz, gain =
        40, bandwidth = .144
octaves, feedforward paramters have extra 6 dB */
        dtmf->filterPtr[6]     =&filter6;
        dtmf->filterPtr[6]->b2  =133;
        dtmf->filterPtr[6]->b1  =-243;
        dtmf->filterPtr[6]->b0  =519;
        dtmf->filterPtr[6]->a2  =16191;
        dtmf->filterPtr[6]->a1  =-12171;
        dtmf->filterPtr[6]->x2  =0;
        dtmf->filterPtr[6]->x1  =0;
        dtmf->filterPtr[6]->y2  =0;
        dtmf->filterPtr[6]->y1  =0;
        dtmf->filterPtr[6]->nrg =0L;
/* sample rate = 7812.5, freq 1633 Hz, gain = 40, bandwidth = .18 octaves, feedforward
paramters have extra 6 dB */
#if UsingAllFilters
        dtmf->filterPtr[7]     =&filter7;
        dtmf->filterPtr[7]->b2  =112;
```

```
                dtmf->filterPtr[7]->b1  =-166;
                dtmf->filterPtr[7]->b0  =539;
                dtmf->filterPtr[7]->a2  =16170;
                dtmf->filterPtr[7]->a1  =-8289;
                dtmf->filterPtr[7]->x2  =0;
                dtmf->filterPtr[7]->x1  =0;
                dtmf->filterPtr[7]->y2  =0;
                dtmf->filterPtr[7]->y1  =0;
                dtmf->filterPtr[7]->nrg =0L;
                /* sample rate = 7812.5,
                   freq 350 Hz, gain = 40,
                   bandwidth = .2 octaves,
feedforward paramters have extra 6 dB */
                dtmf->filterPtr[8]      =(BiQuadPtr)&f8b2;
                dtmf->filterPtr[8]->b2  =263;
                dtmf->filterPtr[8]->b1  =-628;
                dtmf->filterPtr[8]->b0  =391;
                dtmf->filterPtr[8]->a2  =16320;
                dtmf->filterPtr[8]->a1  =-31417;
                dtmf->filterPtr[8]->x2  =0;
                dtmf->filterPtr[8]->x1  =0;
                dtmf->filterPtr[8]->y2  =0;
                dtmf->filterPtr[8]->y1  =0;
                dtmf->filterPtr[8]->nrg =0L;
                /* sample rate = 7812.5,
                   freq 440 Hz, gain = 40,
                   bandwidth = .125
                   octaves,
feedforward paramters have extra 6 dB */
                dtmf->filterPtr[9]      =(BiQuadPtr)&f9b2;
                dtmf->filterPtr[9]->b2  =277;
                dtmf->filterPtr[9]->b1  =-614;
                dtmf->filterPtr[9]->b0  =377;
                dtmf->filterPtr[9]->a2  =16334;
                dtmf->filterPtr[9]->a1  =-30691;
                dtmf->filterPtr[9]->x2  =0;
                dtmf->filterPtr[9]->x1  =0;
                dtmf->filterPtr[9]->y2  =0;
                dtmf->filterPtr[9]->y1  =0;
                dtmf->filterPtr[9]->nrg =0L;
                /* sample rate = 7812.5,
                   freq 480 Hz, gain = 40,
                   bandwidth = .125
                   octaves,
feedforward paramters have extra 6 dB */
                dtmf->filterPtr[10]     =(BiQuadPtr)&f10b2;
                dtmf->filterPtr[10]->b2 =272;
                dtmf->filterPtr[10]->b1 =-606;
                dtmf->filterPtr[10]->b0 =382;
                dtmf->filterPtr[10]->a2 =16329;
                dtmf->filterPtr[10]->a1 =-30306;
                dtmf->filterPtr[10]->x2 =0;
                dtmf->filterPtr[10]->x1 =0;
                dtmf->filterPtr[10]->y2 =0;
                dtmf->filterPtr[10]->y1 =0;
                dtmf->filterPtr[10]-    =0L;
                >nrg
                /* sample rate = 7812.5,
                   freq 620 Hz, gain = 40,
                   bandwidth = .2 octaves,
feedforward paramters have extra 6 dB */
                dtmf->filterPtr[11]     =(BiQuadPtr)&f11b2;
                dtmf->filterPtr[11]->b2 =214;
                dtmf->filterPtr[11]->b1 =574;
                dtmf->filterPtr[11]->b0 =440;
                dtmf->filterPtr[11]->a2 =16271;
                dtmf->filterPtr[11]->a1 =-28679;
                dtmf->filterPtr[11]->x2 =0;
                dtmf->filterPtr[11]->x1 =0;
                dtmf->filterPtr[11]->y2 =0;
                dtmf->filterPtr[11]->y1 =0;
                dtmf->filterPtr[11]-    =0L;
                >nrg
#endif /* UsingAllFilters */
#endif /* False==Sim */
                dtmf->LPFcoef = LPFCOEF;
                dtmf->inputEnergyLPFstate = 0;
                dtmf->prevInputLevel = 99; /* minus 90, no power */
                dtmf->inputThreshold = FetchULongWordInRom(&dtmfInputThreshold);
```

```
            dtmf->filterThresholdCoef = FetchWordInRom(&dtmfFilterThreshold);
            dtmf->filterDifferenceCoef = FetchWordInRom(&dtmfFilterDifference);
            dtmf->filterEnergyLPFstates[0]= 0;
            dtmf->filterEnergyLPFstates[1]= 0;
            dtmf->filterEnergyLPFstates[2]= 0;
            dtmf->filterEnergyLPFstates[3]= 0;
            dtmf->filterEnergyLPFstates[4]= 0;
            dtmf->filterEnergyLPFstates[5]= 0;
            dtmf->filterEnergyLPFstates[6]= 0;
#if UsingAllFilters
            dtmf->filterEnergyLPFstates[7]= 0;
            dtmf->filterEnergyLPFstates[8]= 0;
            dtmf->filterEnergyLPFstates[9]= 0;
            dtmf->filterEnergyLPFstates[10]= 0;
            dtmf->filterEnergyLPFstates[11]= 0;
#endif
            dtmf->dtmfArray[0][0] = One;
            dtmf->dtmfArray[0][1] = Two;
            dtmf->dtmfArray[0][2] = Three;
            dtmf->dtmfArray[0][3] = Akey;
            dtmf->dtmfArray[1][0] = Four;
            dtmf->dtmfArray[1][1] = Five;
            dtmf->dtmfArray[1][2] = Six;
            dtmf->dtmfArray[1][3] = Bkey;
            dtmf->dtmfArray[2][0] = Seven;
            dtmf->dtmfArray[2][1] = Eight;
            dtmf->dtmfArray[2][2] = Nine;
            dtmf->dtmfArray[2][3] = Ckey;
            dtmf->dtmfArray[3][0] = Star;
            dtmf->dtmfArray[3][1] = Zero;
            dtmf->dtmfArray[3][2] = Pound;
            dtmf->dtmfArray[3][3] = Dkey;
}
/*
File:       DTMF.c
Contains:   Routine for detecting DTMF tones
Copyright:  © 1994, 1995 JABRA Corporation, all rights reserved worldwide.
            This file contains DTMF detection filter bank.
*/
#include "globals.h"
#include "dtmf.h"
/************************************************/
#define DtmfChunkSize   40      /* 5 millisecond chunks */
            DtmfParams   dtmfData;
            Pragma__Sect__ramcode
void ProcessDtmf(register DtmfParamsPtr dtmfParams)
{
            short i;
            register SpeechPtr s;
            Speech       spch[DtmfChunkSize];
            s = spch;
            if (GetSpkInCnt( ) >= DtmfChunkSize ) {/*is there enough to dequeue?? */
                if (GetSpkInCnt( ) >= GetSpkInSize( )) {
                        /* start over w/ resynced fifo if overflow has occurred*/
                        InitSpkInFifo(SpkInDelay, SpkInPreQ);
                }
                else {
                    for (i=0; i<DtmfChunkSize; i++) {
                    /* get peak meter reading for absolute DTMF level detection */
                    /* while dequeing the audio data to be analyzed */
                    ProcessMeter(&dtmfParams->dtmfMeter, (*s++ = DeqSpkIn( )));
                    /* see if we need to count down */
                    if (overrideCountdown && (NeedCode == remoteControlMode)) {
                        overrideCountdown--;
                            }
                        }
                        dtmfParams->inputPtr = spch;
                        ProcessChunk( dtmfParams, DtmfChunkSize);
                        ProcessChunkState( dtmfParams );
                  }
            }
}
            Pragma__Sect__text
/************************************************/
void ProcessChunk( register DtmfParamsPtr dtmfPtr, short numSamples)
{
            short x1, x2, y1, y2;
            long A;
            short *input;
```

-continued

```
                long energy;
                short i, filterIndex;
                DtmfState newState;
                short   lowGroupMax, highGroupMax;
                long filter_pair_sum[4], filter_pair_diff[4];
/*
 *      Compute energy for this chunk and store into
 *              dtmfPtr->inputEnergyLPFstate
 */
                y2 = dtmfPtr->inputGain;
                x1 = dtmfPtr->inputDiffState;
                y1 = dtmfPtr->inputInState;
                energy = 0;
                input = dtmfPtr->inputPtr;
                for (i=numSamples; i>0; i--) {
                        A       =       y1;
                        A       *=      31130;
                        A       +=      16384;
                        A       >>=     (SAMPLE_BITS-1);
                        x2      =       *(input);
                        A       +=      x2 - x1;
                        y1      =       A;
                        A       *=      y2;
                        A       +=      16383;
                        A       >>=     (SAMPLE_BITS-1);
                        *(input++) =    A;
                        A       *=      A;
                        A       >>=     ENERGY_SCALER_SHIFT;
                        energy  +=      A;
                        x1      =       x2;
                }
                dtmfPtr->inputDiffState = x1;
                dtmfPtr->inputInState = y1;
                A       =       energy;
                A       -=      dtmfPtr->inputEnergyLPFstate;
                A       +=      16384;
                A       >>=     (SAMPLE_BITS-1);
                dtmfPtr->inputEnergyLPFstate += dtmfPtr->LPFcoef * A;
/*
 *      Adjust gain to limit input level if necessary.
 */
                if (dtmfPtr->inputEnergyLPFstate > ENERGY_LIMIT_HIGH) {
                        A       =       y2;
                        A       *=      GAIN_REDUCTION_STEP;/* drop gain by ¼ dB */
                        A       >>=     (SAMPLE_BITS-1);
                        dtmfPtr->inputGain = A;
                }
                else if ( (dtmfPtr->inputEnergyLPFstate < ENERGY_LIMIT_LOW)
                        && (dtmfPtr->inputGain < (32767-GAIN_INCREASE_STEP))) {
                        /* raise gain very slowly */
                        dtmfPtr->inputGain = y2 + GAIN_INCREASE_STEP;
                }
/*
 *      Then compute energy for each DTMF filter and store into
 *                      dtmfPtr->filterEnergyLPFstates
 */
#if UsingAllFilters
                for (filterIndex=0; filterIndex<12; filterIndex++) {
                        if (7 == filterIndex)
                                continue;    /* ignore A, B, C & D for now */
#else
                for (filterIndex=0; filterIndex<7; filterIndex++) {
                /* just 0-9, plus * & # */
#endif    /* UsingAllFilters */
                        dtmfPtr->filterPtr[filterIndex]->nrg = 0L;
                        input = dtmfPtr->inputPtr;
                        for (i=numSamples; i>0; i--) {
                                DoBq(dtmfPtr->filterPtr[filterIndex], *(input++));
                        }
                        A       =       dtmfPtr->filterPtr[filterIndex]->nrg;
                        A       -=      dtmfPtr->filterEnergyLPFstates[filterIndex];
                        A       >>=     (SAMPLE_BITS-1);
                        dtmfPtr->filterEnergyLPFstates[filterIndex] += dtmfPtr->LPFcoef * A;
                }
/*
 *      Now determine which in the low group has highest energy.
 *      697, 770, 852, 941 Hz
 */
                A = -1;
```

```
            i = 0;
            for (filterIndex=0; filterIndex<4; filterIndex++) {
                if (A < dtmfPtr->filterEnergyLPFstates[filterIndex])
                {
                    A = dtmfPtr->filterEnergyLPFstates[filterIndex];
                    i = filterIndex;
                }
            }
            filter_pair_sum[0] = A;
            filter_pair_diff[0] = A;
            lowGroupMax = i;
            #if (DtmfLoGroupLeds)
            if (kDtmfLoGroup == commonLedMode) {
                if (0 == lowGroupMax)
                    leds = xooo;
                else if (1 == lowGroupMax)
                    leds = oxoo;
                else if (2 == lowGroupMax)
                    leds = ooxo;
                else if (3 == lowGroupMax)
                    leds = ooox;
            }
            #endif /* DtmfLoGroupLeds */
/*
 *          Now determine which in the high group has highest energy.
 *          1209, 1336, 1477, 1633 Hz
 */
            A = -1;
            i = 4;
#if UsingAllFilters
            for (filterIndex=4; filterIndex<8; filterIndex++) {
#else
            for (filterIndex=4; filterIndex<7; filterIndex++) {
#endif
                if (A < dtmfPtr->filterEnergyLPFstates[filterIndex])
                {
                    A = dtmfPtr->filterEnergyLPFstates[filterIndex];
                    i = filterIndex;
                }
            }
            filter_pair_sum[0] += A;
            filter_pair_diff[0] -= A;
            highGroupMax = i - 4;
            #if (DtmfHiGroupLeds)
            if (kDtmfHiGroup == commonLedMode) {
                if (0 == highGroupMax)
                    leds = xooo;
                else if (1 == highGroupMax)
                    leds = oxoo;
                else if (2 == highGroupMax)
                    leds = ooxo;
                else if (3 == highGroupMax)
                    leds = ooox;
            }
            #endif /* DtmfHiGroupLeds */
/*
 *          Now compute dial tone, busy, and ring energy and compare to touch tones.
 */
#if UsingAllFilters
            filter_pair_sum[1]   = dtmfPtr->filterEnergyLPFstates[8]
            + dtmfPtr->filterEnergyLPFstates[9];
            filter_pair_sum[2]   = dtmfPtr->filterEnergyLPFstates[9]
            + dtmfPtr->filterEnergyLPFstates[10];
            filter_pair_sum[3]   = dtmfPtr->filterEnergyLPFstates[10]+
dtmfPtr->filterEnergyLPFstates[11];
            filter_pair_diff[1]  = dtmfPtr->filterEnergyLPFstates[8]
            -dtmfPtr->filterEnergyLPFstates[9];
            filter_pair_diff[2]  = dtmfPtr->filterEnergyLPFstates[9]
            -dtmfPtr->filterEnergyLPFstates[10];
            filter_pair_diff[3]  = dtmfPtr->filterEnergyLPFstates[10]-
dtmfPtr->filterEnergyLPFstates[11];
            A = -1;
            i = 0;
            for (filterIndex=0; filterIndex<4; filterIndex++) {
                if (A    <     filter_pair_sum[filterIndex]) {
                    A    =     filter_pair_sum[filterIndex];
                    i    =     filterIndex;
                }
            }
```

```
                if (filter_pair_diff[i] < 0) {
                    filter_pair_diff[i] = -filter_pair_diff[i];
                }
#else /* UsingAllFilters */
            i=0;
#endif /* UsingAllFilters */
/*
 *              Finally determine the dtmf state.
 */
            energy = dtmfPtr->inputEnergyLPFstate;
            if (energy > dtmfPtr->inputThreshold) {
/* is the energy in the filter pair a significant portion of the overall energy? */
                if (filter_pair_sum[i]
                        > (energy>>(SAMPLE_BITS-1)) *
dtmfPtr->filterThresholdCoef ) {
                    /* are the two different tones roughly the same amount of energy? */
                    if ((filter_pair_diff[1]<<2) <
                        (filter_pair_sum[i]>>(SAMPLE_BITS-3)) *
dtmfPtr->filterDifferenceCoef) {
                        if (i <= 0) {
                            newState =
dtmfPtr->dtmfArray[lowGroupMax][highGroupMax];
                        }
#if UsingAllFilters
                        else if (i <= 1) {
                            newState = DIAL_TONE;
                        }
                        else if (i <= 2) {
                            newState = RING;
                        }
                        else {
                            newState = BUSY;
                        }
#endif /* UsingAllFilters */
                    }
                }
                else {
                    newState = Silence;
                }
            }
            else {
                newState = Silence;
            }
            if (dtmfPtr->state == newState) {
                /* we stop counting if we're longer than 2 ½ minutes or so */
                if (dtmfPtr->stateDuration < 32767) {
                    dtmfPtr->stateDuration++;
                }
            }
            else {
                #define CorrectionFactor
                0
                /* aHexdBp2dB expects energy to be accumulated over 32 samples */
                /* while DTMF accumulates 40 samples */
                dtmfPtr->state = newState;
                dtmfPtr->prevDuration = dtmfPtr->stateDuration;
                /* max level is determined in negative db. -0 is the highest, 99 is lowest */
                dtmfPtr->prevInputLevel = dtmfPtr->dtmfMeter.maxLevel;
                dtmfPtr->dtmfMeter.maxLevel = 99;
                dtmfPtr->stateDuration = 0;
            }
            return;
}
                Pragma_Sect_ramcode
BiQuadPtr       tempPtr;
Speech              tempIn;
short DoBq(BiQuadPtr bq, Speech in)
{
                tempPtr = bq;
                tempIn = in;
                asm(" .global_bq ");
                asm(" .ldpk_tempPtr");
                asm(" .lacl_tempPtr");
                asm     (" sacb        ");
                asm     (" ldpk_tempIn");
                asm     (" lacl_tempIn");
                asm     (" call_bq ");
}
;//
```

-continued

```
;// Meter routines
;//
;//                95-04-26    DTR Initial revision
;//
;//
;#ifdef Copyrights
;static char copyrightNotice[ ] = "Copyright © 1995, JABRA Corporation";
;#endif // Copyrights
                .include algobals.i
                .sect    ".text"
                .if      RamRun
                    .sect    ".ramcode"
                .endif ; RamRun
;**********************************************************************
;*************      _ProcessRmsMeter
;*******************
;**********************************************************************
*on entry:
*           acc contains filtered incoming speech word to measure
*           accb contains filter energy
*           ar3     contains pointer to meter struct
*           ar4     contains pointer to filter struct
*
*on exit:
*           acc contains current meter level in hexdB
*
*trashes:
*           acc, accb, arp, ar3, ar4, PREG, TREG0
_ProcessRmsMeter:            ; argument is in acc
            setc    sxm
            larp    ar3
            adrk    mtrInput       ; point to mtrInput
            sacl    *
            ; save off the (filtered) incoming word
            sbrk    mtrInput       ; point to meter struct
            sacb
            ; and save in accb as well
            ldpk    _numIrqs
            lacl    _numIrqs   ;
            and     #01fh
            sub     #1    ; make this always happen on odd sample
                          ; that way this usage spike never combines with
                          ; ToneDetect, which has a usage spike every 40 words
            bcnd    EveryTime, neq
MeterUpdate:
            ; we only come here every thirty-two times
            (and #01fh)
            ; store away pointers to filter(ar4) and meter(ar3) for future use
            lamm    ar3
            samm    dbmr           ; store ar3 in dbmr temporarily
                                   ; WARNING: The dbmr register is not
                                   ; saved as part of the interrupt
                                   ; context swap. Use with caution....
            lamm    ar4            ; get filter address from AR4
            adrk    mtrMaxInput    ; point to mtrInput
            sacl    *; save filter address, rms meter doesn't use this field otherwise
            sbrk    mtrMaxInput    ; point to meter struct,
            lacb
            ; filter energy is in accb
; compensate by 3 db for the mismatch in ENERGY_SCALER_SHIFT
; which applies to all filter usage. We would only need ENERGY_SCALER_SHIFT = 4
; if this were the only place we were using it.
            sfl         ; 3db up (power)
            call    _aHexdBp2dB    ; convert energy (power) to dB
            call    _adB2HexdB     ; convert dB to hexdB
            sacb                   ; store result in accb
            lamm    dbmr           ; get back pointer to meter
            samm    ar3
            larp    ar3
            nop                    ; avoid pipeline hit
            adrk    mtrMaxInput    ; get back pointer to filter (ar4)
            lar     ar4,*
            ; which had borrowed mtrMaxInput for a while
            sbrk    mtrMaxInput
            larp    ar4
            adrk    BiQuadNrg      ; reset filter energy for next 32 samples
            apl     #0, *+         ; zero out hi word of BiQuadNrg
            apl     #0, *-         ; zero out lo word of BiQuadNrg
            sbrk    BiQuadNrg
```

```
                  larp    ar3
                  adrk    mtrPkInput      ; point to mtrPkInput
                  lacb                    ; get filter energy level (in HexdB)
                  sacl    *               ; store current filter energy level (in HexdB)
                  sbrk    mtrPkInput
EveryTime:
                  lamm    dbmr
                  samm    ar3
                  larp    ar3
                  nop                     ; avoid pipeline hit
                  adrk    mtrPkInput      ; point to mtrPkInput
                  lacc    *               ; load current filter energy level
                  ; used to output a meter history under simulation
                  sbrk    mtrPkInput
RiseOrFall:
                  sacb                    ; store mtrPkInput in accb
                  adrk    mtrPeak         ; point to mtrPeak
                  lacc    *               ;
                  sbrk    mtrPeak         ;
                  exar                    ; swap: input in acc, mtrPeak in accb
                  sbb                     ; subtract mtrPeak from target level
* the following three destinations are at the end of the
* _ProcessPeakMeter routine. This saves us from duplicating code
                  bcnd    MtrPeakFalling, lt
                  bcnd    MtrPeakRising, gt
                  b       MtrPeakSame
;********************************************************************
;********************    _ProcessPeakMeter*******************
;********************************************************************
*on entry:
*       acc     contains incoming speech word to measure
*       ar3     contains pointer to meter struct
*
*on exit:
*       acc     contains current meter level in hexdB
*
*trashes:
*       acc, accb, arp, ar3, PREG, TREG0
_ProcessPeakMeter:                        ; argument is in acc
                  setc    sxm             ; set sign extension mode
                  samm    TREG0           ; stash the unmodified new input word
                  and                     #08000h; store sign bit in accb
                  sacb                    ;
                  larp    AR3             ; point to meter struct
DidSignChange:
                  adrk    mtrInput        ; point to mtrInput
                  lacl    *               ; load the previous input word
                  sbrk    mtrInput        ; point to meter struct
                  and                     #08000h      ; get the sign bit in acc
                  sbb                     ; compare sign bits
                  bcnd    SameSign, eq
SignChanged:                              ; zero-crossing
                  adrk    mtrMaxInput     ; point to mtrMaxInput
                  lacl    *
                  ; copy mtrMaxInput into pkInput
                  sbrk    mtrMaxInput
                  adrk    mtrPkInput      ; point to mtrPkInput
                  sacl    *
                  ; update mtrPkInput
                  sbrk    mtrPkInput      ; point to meter struct
                  ldpk    0
                  lacc    TREG0           ; load unmodified input word
                                          ; with high bit extended
                  adrk    mtrInput        ; point to mtrInput
                  sacl    *
                  sbrk    mtrInput        ; point to meter struct
                  abs
                  adrk    mtrMaxInput     ; point to mtrMaxInput
                  sacl    *    ; start with abs(newSample) as max for the new half-cycle
                  sbrk    mtrMaxInput     ;
                  b               ProcessPeakLpf
SameSign:
                  ldpk    0
                  lacc    TREG0           ; load unmodified input word w/ sign bit extended
                  adrk    mtrInput        ; point to mtrInput
                  sacl    *
                  sbrk    mtrInput        ; point to meter struct
                  abs                     ; get absolute value
                  sacb                    ; and store it in accb
```

-continued

```
        adrk    mtrMaxInput      ; point to mtrMaxInput
        lacc    *                ; load w/sign bit extended
        sbrk    mtrMaxInput     ;
        abs                      ; get absolute value
        sbb
        bcnd    ProcessPeakLpf, geq
NewMtrInputMax:
        lacb
        adrk    mtrMaxInput      ; point to mtrMaxInput
        sacl    *                ; substitute the new higher max
        sbrk    mtrMaxInput     ;
        adrk    mtrPkInput       ; point to mtrPkInput
        sub     *                ; get target value
        sbrk    mtrPkInput       ; point to meter struct
        bcnd    ProcessPeakLpf, leq
NewPkInput:
        lacb
        adrk    mtrPkInput       ; point to mtrPkInput
        sacl    *                ; update pkInput immediately, rather than
        sbrk    mtrPkInput       ; waiting for a zero crossing
ProcessPeakLpf:
        adrk    mtrPeak          ; point to mtrPeak
        lacc    *                ; get current value
        sbrk    mtrPeak
        sacb                     ; target in acc, mtrPeak in accb
        adrk    mtrPkInput       ; point to mtrPkInput
        lacl    *                ; get target value
        sbrk    mtrPkInput       ; waiting for a zero crossing
        sbb                      ; subtract mtrPeak from target level
        bcnd    MtrPeakFalling, lt
        bcnd    MtrPeakRising, gt
MtrPeakSame:
        adrk    mtrPeak          ; point to mtrPeak
        lacl    *                ; get current value
        sbrk    mtrPeak
        b       MtrPeakDone
MtrPeakFalling:
        adrk    mtrFallTime
        lt      *
        sbrk    mtrFallTime
        adrk    mtrPkInput
        mpy     **
        sbrk    mtrPkInput
        pac
        adrk    mtrFallTimeInv
        lt      *
        sbrk    mtrFallTimeInv
        adrk    mtrPeak   ; point to mtrPeak
        mpy     *         ; multiply by current value
        apac
        bsar    15
        sacl    *
        sbrk    mtrPeak
        b       MtrPeakDone
MtrPeakRising:
        adrk    mtrRiseTime      ; point to mtrPeak
        lt      *
        sbrk    mtrRiseTime
        adrk    mtrPkInput       ; point to mtrPkInput
        mpy     *
        sbrk    mtrPkInput
        pac
        adrk    mtrRiseTimeInv   ; point to mtrPeak
        lt      *
        sbrk    mtrRiseTimeInv
        adrk    mtrPeak          ; point to mtrPkInput
        mpy     *
        apac
        bsar    15
        sacl    *
        sbrk    mtrPeak
MtrPeakDone:
* transform peak (currently in HexdB) into dB
        call    _aHexdB2dB
        ; trashes accb, arp, ar3, and TREG0
*       store the level (in dB) into the level field of the meter struct
        larp    ar3
        adrk    mtrLevel
        sacl    *
```

-continued

```
            sacb
            sbrk        mtrLevel
* check for max level since startup
            lacb
            adrk        mtrMaxLevel
            sub         *
            sbrk        mtrMaxLevel
            bcnd        MeterDone, geq      ;branch if current level is not higher than
                                            ;maxLevel in this case, remember that a
                                            ;minus sign is implicit
                                            ; in the levels: i.e. 0 is greater than (minus) 3.
                                            ; (minus) 6 is greater than (minus) 12, etc
            lacb
            adrk        mtrMaxLevel         ; switch in new max level
            sacl        *
            sbrk        mtrMaxLevel
MeterDone:
            ret
;// Module: Isr.a
;//
;// Assembly language Interrupt Service Routines
;//
;// Rev 1.0  18 Nov 1994  DTR
;//                 Initial revision.
;//
;//
;#ifdef Copyrights
;static char copyrightNotice[ ] = "Copyright © 1994, JABRA Corporation";
;#endif // Copyrights
            .include aglobals.i
            .include qmacros.i
            .text
; the bit code used by the BIT instruction, contrary to normal usage
bit0        .set        0Fh
; declare ports 4, 5, and 6 using macros
            inx         4
            outx        5
            outx        6
* declare biquad filters using macros
            biquadFilter   0   ;   DTMF
            biquadFilter   1   ;   DTMF
            biquadFilter   2   ;   DTMF
            biquadFilter   3   ;   DTMF
            biquadFilter   4   ;   DTMF
            biquadFilter   5   ;   DTMF
            biquadFilter   6   ;   DTMF
            biquadFilter   20  ;   Audio, mic mtr
            biquadFilter   21  ;   Audio, mic signal
            biquadFilter   22  ;   Audio, spk mtr
            biquadFilter   23  ;   Audio, spk signal
ISRrelay:                          ; this is allocated in ROM
            b           SerialRcvIsr
            .sect       ".cpyrite"
            ; one letter for each rom (hi and lo)
            ; results in a full copyright notice on each rom
            .string "CCooppyyrriigghhtt((cc)) 11999944,, 11999955,, JJAABBRRAA
CCoorrppoorraattiioonn"
_FifoBufferSize     .set    64
_micInFifoQ         .usect  "fifo", _FifoBufferSize
_micOutFifoQ        .usect  "fifo", _FifoBufferSize
_spkInFifoQ         .usect  "fifo", _FifoBufferSize
_spkOutFifoQ        .usect  "fifo", _FifoBufferSize
__usMicInFifoHead   .usect  ".fifo2", 1
__usMicInFifoTail   .usect  ".fifo2", 1
__usMicInFifoCnt    .usect  ".fifo2", 1
__usMicInFifoSize   .usect  ".fifo2", 1
__usMicInFifoMask   .usect  ".fifo2", 1
__usMicInFifoDelay  .usect  ".fifo2", 1
__usMicInFifoHead   .usect  ".fifo2", 1
__usMicOutFifoTail  .usect  ".fifo2", 1
__usMicOutFifoCnt   .usect  ".fifo2", 1
__usMicOutFifoSize  .usect  ".fifo2", 1
__usMicOutFifoMask  .usect  ".fifo2", 1
__usMicOutFifoDelay .usect  ".fifo2", 1
__usSpkInFifoHead   .usect  ".fifo2", 1
__usSpkInFifoTail   .usect  ".fifo2", 1
__usSpkInFifoCnt    .usect  ".fifo2", 1
__usSpkInFifoSize   .usect  ".fifo2", 1
__usSpkInFifoMask   .usect  ".fifo2", 1
```

-continued

```
_usSpkInFifoDelay      .usect  ".fifo2", 1
_usSpkOutFifoHead      .usect  ".fifo2", 1
_usSpkOutFifoTail      .usect  ".fifo2", 1
_usSpkOutFifoCnt       .usect  ".fifo2", 1
_usSpkOutFifoSize      .usect  ".fifo2", 1
_usSpkOutFifoMask      .usect  ".fifo2", 1
_usSpkOutFifoDelay     .usect  ".fifo2", 1
_hiRamArea             .usect  ".hiRam", (0080h–18h); allocate the remainder of the page
                                       ; that's left over after .fifo2 is allocated
_dBTableSize           .set    91
_dummy                 .usect  ".dummy", 1
        .if     RamRun
                .sect   ".ramcode"
                .label  _ram_load   ; isr.a is the first file to be linked in
                                    ; therefore this location will be the first location
                                    ; in .ramcode
        .else
                .sect   ".ramcode"
                .label  _ram_load
                        NOP
                        NOP
                .text
        .endif
************************************************************
************************************************************
SerialRcvIsr:
******************* Microphone Processing *******************
GetIsrTime:
        lamm    TIM         ; get the current timing count
        sacb                ; and put it into accb
CheckIsrTiming:
        ldpk    _xcommonLastTime
        lacl    _xcommonLastTime; get the time when we were last here
        lt      _xcommonLastTime; and get that value in T also
        exar
        sacl    _xcommonLastTime ; store current TIM value
        exar
        sbb                 ; subtract new value (accb) from previous value (acc)
        bcnd    StoreRegs, lt   ; don't store a value if rollover occurred
NoRollover:
        ldpk    _xcommonPeriod
        sacl    _xcommonPeriod
StoreRegs:
        smmr    AR3, _tempAR3
        smmr    AR4, _tempAR4
MicrophoneInput:
        lamm    DRR
        and     #0fff8h
        call    _MixMic0SndOut  ; get the input data from codec 1
                                ; mix in next sound out value
CheckMicMode:
        ldpk    _micMode        ; point to the mic channel mode switch
        cpl     #0, _micMode    ; set tc bit if muting is engaging
        bcnd    CheckMicThruMode, ntc ; continue processing if muting not
                                      ; engaged
MicMuteMode:
        zac                     ; otherwise zero the accumulator
        b       MicrophoneOutputMixing; and go mix in the output sound, if any
CheckMicThruMode:
        cpl     #1, _micMode    ; pass signal thru with no alteration
        bcnd    MicrophoneOutputMixing, tc; continue processing if remote
                                          ; control not engaged
MicrophoneOutputMixing:
        call    _MixMicSndOut   ; mix in next sound out value
MicDone:
        and     #0fff8h
        ldpk    _commonMicAttn
        or      _commonMicAttn
        samm    DXR     ; output new speech value
******************* Speaker Processing *******************
SpeakerInput:
        ldpk    0
        lac     TRCV, 16
        and     #0fff8h, 16
        ldpk    _commonLastSpkIn
        sach    _commonLastSpkIn    ; store away for ToneDetect
        sacb
SpeakerInputGainStage:
        ldpk    _commonSpkGainPre
        cpl     #0, _commonSpkGainPre
```

```
              bcnd    ScaleSpkInTo16, tc; 6 dB boost
              addb              ; add accumulator to itself
              sacb              ; and hide it back in accb
              cpl     #1, _commonSpkGainPre
              bcnd    ScaleSpkInTo16, tc; 6 dB boost
              addb              ; add accumulator to itself
              sacb              ; and hide it back in accb
              cpl     #2, _commonSpkGainPre
              bcnd    ScaleSpkInTo16, tc      ; 6 dB boost
              addb                  ; add accumulator to itself
              sacb                  ; and hide it back in accb
              cpl     #3, _commonSpkGainPre
              bcnd    ScaleSpkInTo16, tc     ; 6 dB boost
              addb                          ; add accumulator to itself
ScaleSpkInTo16:
              bsar    16            ; scale word down to 16 bits for fifo
CheckSpeakerMode:
              ldpk    _spkMode     ; see if spkMode is Mute
              cpl     #0, _spkMode; set tc bit if muting is engaged
              bcnd    CheckSpkThruMode, ntc
                      ; continue processing if muting not engaged
SpkMuteMode:
              zac              ; otherwise zero the accumulator
              b       SpeakerOutputGainStage
                      ; and go mix in the output sound, if any
CheckSpkThruMode:
              cpl     #1, _spkMode; pass signal thru with no alteration
              bcnd    SpeakerOutputGainStage, tc
                      ; continue processing if remote control not engaged
SpeakerOutputGainStage:
* shift signal from lo to hi word of acc
              samm    TREG0        ; move speech data to T reg
              ldpk    0
              lacc    TREG0, 16    ; get 16 bit data into high word of acc
              sacb                 ; hide audio word in accb
              ldpk    _commonSpkGainPost
              cpl     #0, _commonSpkGainPost
              bcnd    ScaleSpkOutTo16, tc    ; 6 db boost
              addb                          ; add accumulator to itself
              sacb                          ; and hide it back in accb
              cpl     #1, _commonSpkGainPost
              bcnd    ScaleSpkOutTo16, tc    ; 6 db boost
              addb                  ; add accumulator to itself
              sacb                  ; and hide it back in accb
              cpl     #2, _commonSpkGainPost
              bcnd    ScaleSpkOutTo16, tc    ; 6 db boost
              addb                          ; add accumulator to itself
              sacb                          ; and hide it back in accb
              cpl     #3, _commonSpkGainPost
              bcnd    ScaleSpkOutTo16, tc    ; 6 db boost
              addb                          ; add accumulator to itself
              sacb                          ; and hide it back in accb
ScaleSpkOutTo16:
              bsar    16            ; scale word down to 16 bits for fifo
SpeakerOutputMixing:
              call    _MixSpkSndOut    ; mix in next sound out value
SpeakerControl:
              and     #0fff8h
              ldpk    _commonSpkAttn
              or      _commonSpkAttn
              samm    TDXR          ; output new speech value
******************* Dtmf Stuff *******************
              ldpk    _commonLastSpkIn
              lacc    _commonLastSpkIn, 16; tone detect likes to see a 32-bit argument
DtmfGainStage:
              sacb
              ldpk    _commonDtmfGainPre
              cpl     #0, _commonDtmfGainPre
              bcnd    HandleDtmf, tc; 6 dB boost
              addb              ; add accumulator to itself
              sacb              ; and hide it back in accb
              cpl     #1, _commonDtmfGainPre
              bcnd    HandleDtmf, tc; 6 dB boost
              addb              ; add accumulator to itself
              sacb              ; and hide it back in accb
              cpl     #2, _commonDtmfGainPre
              bcnd    HandleDtmf, tc
              addb                  ; add accumulator to itself
              sacb                  ; and hide it back in accb
```

-continued

```
            cpl         #3, _commonDtmfGainPre
            bcnd        HandleDtmf, tc; 6 dB boost
            addb                        ; add accumulator to itself
            sacb                        ; and hide it back in accb
HandleDtmf:
            ldpk        _remoteControl
            cpl         #1, _remoteControl; are we in full dtmf detection?
            bcnd        HandleToneDetect, ntc
HandleRemoteControl:
            bsar        16          ; scale word down to 16 bits for fifo
            call        _EnqSpkIn   ; and set it off to the upper level
            b               IncNumIrqs
HandleToneDetect:
            call        ToneDetect  ; otherwise process it right here
******************* System Stuff *******************
IncNumIrqs:
            lack        #1
            ldpk        _numIrqs
            add         _numIrqs
            sacl        _numIrqs
RestoreRegs:
            lmmr        AR3, _tempAR3
            lmmr        AR4, _tempAR4
TimeInterrupt:
            lamm        TIM     ; get the current timing count
            sacb                 ; and put it into accb
            ldpk        _xcommonLastTime
            lacl        _xcommonLastTime
            ; get the time when we were the head of the interrupt
            lt                _xcommonLastTime; and get that value in T also
            sbb              ; subtract new value (accb) from previous value (acc)
            bcnd        IsrDone, lt  ; don't store a value if rollover occurred
NoTimeRollover:
            sacb
            .if Sim
            ldpk        _xcommonThisIsr
            sacl        _xcommonThisIsr
            .endif
CheckLongestIsr:
            ldpk        _xcommonLongestIsr
            sub          _xcommonLongestIsr
            bcnd        CheckShortestIsr, leq
NewLongestIsr:
            lacb
            sacl        _xcommonLongestIsr
            b               IsrDone
CheckShortestIsr:
            lacb
            ldpk        _xcommonShortestIsr
            sub          _xcommonShortestIsr
            bcnd        IsrDone, geq
NewShortestIsr:
            lacb
            sacl        _xcommonShortestIsr
IsrDone:
            larp        1       ; set back to system standard
            rete
*************************************************************
******************* The Sound Mixing Routines *****************
*************************************************************
            .text
_MixMicSndOut
; receives a data word to mix sound with in acc
; returns a new data word with the sound mixed in if on,
; or with the same data word passed in, if sound off
; sound playback is setup to play back 8k sounds
; so set the sample rate to 8k before playing sounds
            sacb                ; store acc in accb for a while
            ldpk        _micSndPtr
            lacl        _micSndPtr
            bcnd        ReturnMicZero, eq; is there a sound to play?
            ldpk        0
            tblr        TREG0
            ; copy the word from program memory at _sndStart to _sndTemp
            add         #1          ; point to next snd word
            ldpk        _micSndPtr
            sacl        _micSndPtr
ChkMicSndEnd:
            ldpk        _micSndEnd
```

-continued

```
                lacc       _micSndEnd
                ldpk       _micSndPtr
                sub        _micSndPtr
                bcnd       ReturnMicMixed, neq; is the sound finished playing?
ChkMicSndLoops:
                ldpk       _micSndNumLoops; now we're at the end of the sound
                lacc       _micSndNumLoops; see if we need to loop
                bcnd       StopMicSnd, eq
                sub        #1
                sacl       _micSndNumLoops; decrement the loop count
ResetMicSndLoop:
                ldpk       _micSndStart    ; loop points are the start and end of sound
                lacl       _micSndStart
                ldpk       _micSndPtr      ; reset pointer to start of sound
                sacl       _micSndPtr
                b          ReturnMicMixed
StopMicSnd:
                zac
                ldpk       _micSndStart
                sacl       _micSndStart    ; zero out sound parameters
                ldpk       _micSndPtr      ; so sound won't play next time
                sacl       _micSndPtr
                ldpk       _micSndEnd      ; looped sounds will never get to this point
                sacl       _micSndEnd
ReturnMicZero:
                lacb                       ; put accb back into acc, no mixing
                ret
ReturnMicMixed:
                ldpk       _micSndLevel; multiply speech data (already in TREG0)
                mpy        _micSndLevel; by playback level
                pac                        ; move product into accumulator
                bsar       15              ; scale result back into lower word
                addb                       ; add back the speech to mix with
                ret
_MixMic0SndOut
; receives a data word to mix sound with in acc
; returns a new data word with the sound mixed in if on,
; or with the same data word passed in, if sound off
; sound playback is setup to play back 8k sounds
; so set the sample rate to 8k before playing sounds
                sacb                       ; store acc in accb for a while
                ldpk       _mic0SndPtr
                lacl       _mic0SndPtr
                bcnd       ReturnMic0Zero, eq; is there a sound to play?
                ldpk       0
                tblr       TREG0
; copy the word from program memory at _sndStart to _sndTemp
                add        #1   ; point to next snd word
                ldpk       _mic0SndPtr
                sacl       _mic0SndPtr
ChkMic0SndEnd:
                ldpk       _mic0SndEnd
                lacc       _mic0SndEnd
                ldpk       _mic0SndPtr
                sub        _mic0SndPtr
                bcnd       ReturnMic0Mixed, neq; is the sound finished playing?
ChkMic0SndLoops:
                ldpk       _mic0SndNumLoops; now we're at the end of the sound
                lacc       _mic0SndNumLoops; see if we need to loop
                bcnd       StopMic0Snd, eq
                sub        #1
                sacl       _mic0SndNumLoops; decrement the loop count
ResetMic0SndLoop:
                ldpk       _mic0SndStart; loop points are the start and end of sound
                lacl       _mic0SndStart
                ldpk       _mic0SndPtr     ; reset pointer to start of sound
                sacl       _mic0SndPtr
                b          ReturnMic0Mixed
StopMic0Snd:
                zac
                ldpk       _mic0SndStart
                sacl       _mic0SndStart; zero out sound parameters
                ldpk       _mic0SndPtr     ; so sound won't play next time
                sacl       _mic0SndPtr
                ldpk       _mic0SndEnd ; looped sounds will never get to this point
                sacl       _mic0SndEnd
ReturnMic0Zero:
                lacb                       ; put accb back into acc, no mixing
                ret
```

-continued

```
ReturnMic0Mixed:
        ldpk    _mic0SndLevel; multiply speech data (already in TREG0)
        mpy        _mic0SndLevel; by playback level
        pac                     ; move product into accumulator
        bsar    15              ; scale result back into lower word
        ret
_MixSpkSndOut
; receives a data word to mix sound with in acc
; returns a new data word with the sound mixed in if on,
; or with the same data word passed in, if sound off
; sound playback is setup to play back 8k sounds
; so set the sample rate to 8k before playing sounds
        sacb                    ; store acc in accb for a while
        ldpk    _spkSndPtr
        lacl    _spkSndPtr      ; get pointer to next word to play
        bcnd    ReturnSpkZero, eq; return if null pointer
        ldpk    0
        tblr    TREG0
                                ; copy the word from program memory at _sndStart to TREG0
        add     #1              ; point to next snd word
        ldpk    _spkSndPtr
        sacl    _spkSndPtr
ChkSpkSndEnd:
        ldpk    _spkSndEnd
        lacc    _spkSndEnd
        ldpk    _spkSndPtr
        sub     _spkSndPtr
        bcnd    Return SpkMixed, neq ; are we at the end of the sound
ChkSpkSndLoops;
        ldpk    _spkSndNumLoops
        lacc    _spkSndNumLoops
        bcnd    StopSpkSnd, eq; should we loop?
        sub     #1
        sacl    _spkSndNumLoops; decrement the loop count
ResetSpkSndLoop:
        ldpk    _spkSndStart    ; loop points are the start and end of sound
        lacl    _spkSndStart
        ldpk    _spkSndPtr      ; reset pointer to start of sound
        sacl    _spkSndPtr
        b       ReturnSpkMixed
StopSpkSnd:                     ; stop playing the sound
        lack    #0
        ldpk    _spkSndStart
        sacl    _spkSndStart    ; zero out sound parameters
        ldpk    _spkSndPtr      ; so sound won't play next time
        sacl    _spkSndPtr
        ldpk    _spkSndEnd      ; looped sounds will never get to this point
        sacl    _spkSndEnd
ReturnSpkZero:
        lacb                    ; put accb back into acc, no mixing
        ret
ReturnSpkMixed:
        ldpk    _spkSndLevel ; multiply speech data (already in TREG0)
        mpy        _spkSndLevel ; by playback level
        pac                     ; move product into accumulator
        bsar    15              ; scale result back into lower word
        ret
******************* End of ISR *****************
;// Module: ProgWrit.a
;//
;// Interrupt vectors in lowest 30h words of C5x program memory.
;//
;// Rev 1.0  11 Nov 1994  DTR
;//      Initial revision.
;//
;//
;#ifdef Copyrights
;static char copyrightNotice[ ] = "Copyright © 1994, JABRA Corporation";
;#endif // Copyrights
;
        .tab    4
        .width  120
        .length 32767
        .version 50
        .mmregs
**********************************************
*       RAM based code
**********************************************
        .sect   ".ramcode"
```

-continued

```
;/*************************************************/
;/*Copy a page from DATA RAM to PROG ram or flash rom */
;/*************************************************/
;Boolean WritePageToAtmel(short * src, short * dst)
;
;/* destination is always on 128 byte boundary, since lower 7 bits of dst are ignored */
;              /* src can be anywhere, even on the C run-time stack */
              .global _WritePageToAtmel
_WritePageToAtmel:
              .global _previousReading      ;
              .global _currentReading       ;
              .global _xorResult            ;
PageSize      .set        128               ;
PollTimeOut   .set        15000    ;
RAM_ON              .set        0010h           ;
RAM_MASK .set     (0ffh - RAM_ON)         ;
                                            ;
          popd         *+         ; generate stack from and pointers to parameters
          sar          AR0, *+    ;
          sar          AR1, *     ;
          lark         AR0, 1     ;
          lar          AR0, *0+   ;
                                  ;
WritePrep:                        ;
                                  ;
                                  ;
          lpd          #0         ;
          sar          AR1, AR4   ; copy the stack pointer into AR4
          nop                     ;
          nop                     ;
          mar          *, AR4     ; make AR4 the active address register
          sbrk         4          ; point to src on stack
                                  ;
          lar          AR3, *-    ; get ptr to src in AR3
          lacc         *          ; get ptr to dest in accum
          and          #0FF80h    ; mask out low seven bits
          sacb                    ;
          dint                    ; can only write to ROM from RAM
                                  ;
                                  ;
; Biquad filter code
; Tonedetect and Manual    override for moving
; outof    current         operating mode into remote calibration
          .include aglobals.i
          .include qmacros.i
          .sect     ".text"
          .if       RamRun
              .sect    ".ramcom"
          .endif    ; RamRun
ShortOverrideDuration     .set  (700/5); in milliseconds,
SW1ON                .set   0dh           ; Bit test (2) for SW1ON in Gate Array.
TRM_OFF              .set   0fffdh ;
          FbqBiQuadFilter     0; coefficients & states allocated in common section
          FbqBiQuadFilter     1; coefficients & states allocated in common section
;*****************************************************************
;****************** The Biquad Filter Routine *****************
;*****************************************************************
SAMPLE_BITS                 .set    16
ENERGY_SCALER_SHIFT .set   6
_bq:
; entry:
;         acc     contains the incoming speech in lower 16 bits, and returns the
;         outgoing accb contains a pointer to the biquad structure
;
; returns:
;         acc contains result (filtered sample in low 16 bits)
;         accb contains accumulated energy
;         the biquad structure is updated with the most recent state variables
;         and energy
;
; in use:
;         ar3 handles the coefficients in order: b2, b1, b0, a2, and a1
;         ar4 handles the state variables in order: x2, x1, y2, y1, and energy
;         This biquad filter takes advantage of the fact that the coefficients
;         and state variables are accessed in or nearly in order. One index register
;         is used to walk through the coefficients, and a second one is used to walk
;         through the state variables. The coefficients and state variables must be
;         contained in a BiQuad struct declared in C. The structure must not vary
;
```

-continued

```
; Trashes
;           acc, accb, ar3, ar4, treg0, arp, spm
;
;struct   BiQuad {
;           short     b2;
;           short     b1;
;           short     b0;
;           short     a2;
;           short     a1;
;           Speech    x2;
;           Speech    x1;
;           Speech    y2;
;           Speech    y1;
;           long      nrg;
;};
;typedef struct BiQuad BiQuad, * BiQuadPtr;
state_ar4   .set    ar4
coef_ar3    .set    ar3
            exar
            ; put input speech word into accb
            samm    coef_ar3    ; this generates a pipeline warning, ignore it
            larp    coef_ar3
            nop
            cpl     #0, *
            bcnd    SetUpStatePtr, ntc ; filter is on, because b2 (1$^{st}$ coeff) isn't zero
            zac                 ; return w/ input speech word in acc
            exar                ; and zero energy in accb
            b       BqDone
SetUpStatePtr:
            samm    state_ar4   ; this generates a pipeline warning, ignore it
            larp    state_ar4
            nop
            adrk    5           ; the states are after coeffs, which are 5 words long
;           A    = b2 * x2;
A_eq_b2_X_x2:
            lt      *+, coef_ar3; x2 afterwards state_ar4->x1, ARP =coef_ar3
            mpy     *+, state_ar4    ; *b2 afterwards coef_ar3->b1, ARP =state_ar4
            pac
;           A += b1 * x1;
A_pl_eq_b1_X_x1:
            lt      *, coef_ar3; x1 afterwards state_ar4->x1, ARP =coef_ar3
            mpy     *+, state_ar4; *b1 afterwards coef_ar3->b0, ARP state_ar4
            apac
;           x2 = x1;
;           x1 = *(input++);
x1_eq_speech:
            exar                ; stash A in accb, get speech input in acc
            sacl    *-; x1 = input afterwards state_ar4->x2, ARP =state_ar4
x2_eq_x1:
            lamm    TREG0; we still have the old x1 in the T reg, so we use it
            sacl    *+; x2 = x1 afterwards state_ar4->x1, ARP =state_ar4
            lacb                ; get A back into acc
;           A += b0 * x1;
A_pl_eq_b0_X_x1:
            lt      *+, coef_ar3; x1 afterwards state_ar4->y2, ARP =coef_ar3
            mpy     *+, state_ar4    ; * b0 afterwards coef_ar3->a2, ARP =state_ar4
            apac
;           A -= a2 * y2;
A_mi_eq_a2_X_y2:
            lt      *+, coef_a3 ; y2 afterwards state_ar4->y1, ARP =coef_ar3
            mpy     *+, state_ar4    ; *a2 afterwards coef_ar3->a1, ARP =state_ar4
            spac
;           A -= a1 * y1;
A_mi_eq_a1_X_y1:
            lt      *, coef_ar3 ; y1 afterwards state_ar4->y1, ARP =coef_ar3
            mpy     *, state_ar4    ; *a1 afterwards coef_ar3->ar1, ARP =state_ar4
            spac
;           A += 8192;
            addk    #8192
;           A >>= (SAMPLE_BITS-2);
            bsar    SAMPLE_BITS-2
;           y2 = y1;
;           y1 = A;
y1_eq_A_:
            sacl    *-; first store accum A in y1 afterwards state_ar4->y2, ARP =coef_ar3
            sacb                ; and store A in accb as well
;y2_eq_old_y1:
            lamm    TREG0 ; then store old y1 (from treg0) in y2
            sacl    *+; then point to y1 again, which is equal to A
```

```
                    mar     *+; now point to low word of nrg
                    mar     *+; now point to high word of nrg
                    lacc    *-, 16; get high word in acc, point to low word
                    adds    *-; add in low word, point back to y1 (A)
        ;           A       *=      A;
                    spm     3; shift PREG >> 6 when adding to ACC
                    zpr             ; zero the product register so nothing is accumulated
                    sqra    *+; get y1 again (A) and load into TREG0, sqr, result in preg
        ;           A       >>=     ENERGY_SCALER_SHIFT;
        ;           energy  +=      A;
                    apac
                    sacl    *+; store the low word of nrg
                    sach    *; store the high word of nrg
                    exar            ; return w/ result in acc
                                    ; and energy in accb
BqDone:
                    spm     0; set PREG auto-shift back to none
                    ret
;**************************************************************;
_fbq:
        ;           acc contains the incoming speech, and returns the outgoing
        ;           accb contains a pointer to the biquad structure in use,
        ;           ar3 handles the coefficients in order: b2, b1, b0, a2, and a1
        ;           ar4 handles the state variables in order: x2, x1, y2, y1, and energy
        ;           This biquad filter takes advantage of the fact that the coefficients
        ;           and state variables are accessed in or nearly in order. One index register
        ;           is used to walk through the coefficients, and a second one is used to walk
        ;           through the state variables. The coefficients and state variables must be
        ;           contained in a BiQuad struct declared in C. The structure must not vary
        ;
;struct     BiQuad {
;           short   b2;
;           short   b1;
;           short   b0;
;           short   a2;
;           short   a1;
;           Speech          x2;
;           Speech          x1;
;           Speech          y2;
;           Speech          y1;
;           long    nrg;
;};
;typedef struct BiQuad BiQuad, * BiQuadPtr;
SAMPLE_BITS                 .set    16
ENERGY_SCALER_SHIFT .set     6
state_ar4   .set    ar4
coef_ar3    .set    ar3
            exar
            samm    state_ar4       ; this generates a pipeline warning, ignore it
            samm    coef_ar3        ; this generates a pipeline warning, ignore it
            mar     *, state_ar4
            adrk    5               ; the states are after coeffs, which are 5 words long
        ;   A       = b2 * x2;
;A___eq_b2_X_x2;
            lt      *+, coef_ar3; x2 afterwards state_ar4->x1, ARP = coef_ar3
            mpy     *+, state_ar4; *b2 afterwards coef_ar3->b1, ARP = state_ar4
            pac
        ;   A += b1 * x1;
;A___pl_eq_b1_X_x1:
            lt      *, coef_ar3; x1 afterwards state_ar4->x1, ARP = coef_ar3
            mpy     *+, state_ar4; *b1 afterwards coef_ar3->b0, ARP =state_ar4
            apac
        ;   x2 = x1;
        ;   x1= *(input++);
;x1___eq_speech:
            exar            ; stash A in accb, get speech input in acc
            sach    *-; x1 = input afterwards state_ar4->x2, ARP =state_ar4
;x2_eq_x1:
            lamm    TREG0; we still have the old x1 in the T reg, so we use it
            sacl    *+; x2 = x1 afterwards state_ar4->x1, ARP =state_ar4
            lacb            ; get A back into acc
        ;   A += b0 * x1;
;A___pl_eq_b0_X_x1:
            lt      *+, coef_ar3    ; x1 afterwards state_ar4->y2, ARP =coef_ar3
            mpy     *+, state_ar4   ; *b0 afterwards coef_ar3->a2, ARP =state_ar4
            apac
        ;   A -= a2 * y2;
;A___mi_eq_a2_X_y2:
            lt      *+, coef_ar3 ; y2 afterwards state_ar4->y1, ARP =coef_ar3
```

```
                mpy     *+, state_ar4; *a2 afterwards coef_ar3->a1, ARP =state_ar4
                spac
;               A -= a1 * y1;
;A__mi_eq_a1_X_y1:
                lt      *, coef_ar3      ; y1 afterwards state_ar4->y1, ARP =coef_ar3
                mpy     *, state_ar4     ; *a1 afterwards coef_ar3->a1, ARP =state_ar4
                spac
;               A += 8192;
                addk    #8192
;               A >>= (SAMPLE_BITS-2);
                bsar    SAMPLE_BITS-2
;               y2 = y1;
;               y1 = A;
y1_eq_A_:
                sacl    *-; first store accum A in y1 afterwards state_ar4->y2, ARP coef_ar3
                sacb    ; and store A in accb as well
;y2_eq_old_y1:
                lamm    TREG0; then store old y1 (from treg0) in y2
                sacl    *+       ; then point to y1 again, which is equal to A
                mar     *+       ; now point to low word of nrg
                mar     *+       ; now point to high word of nrg
                lacc    *-, 16   ; get high word in acc, point to low word
                adds    *-       ; add in low word, point back to y1 (A)
;               A *= A;
                spm     3; shift PREG >> 6 when adding to ACC
                zpr     ; zero the product register so nothing is accumulated
                sqra    *+; get y1 again (A) and load into TREG0, sqr, result in preg
;               A >>= ENERGY_SCALER_SHIFT;
;               energy += A;
                apac
                sacl *+; store the low word of nrg
                sach *-; store the high word of nrg and point back to low word
                mar *-; point back to y1 (A)
                lacc *, 16; get result from y1, shifted into high word of acc
                spm     0
                ret
************************************************************************
;--------------------------------;
************************************************************************
_ModeInOutB         .set 0;
_ModeNC2            .set 1;
_ModeDynamics       .set 2;
ToneDetect:
                sacb    ; speech word is in high word of acc, store it
                ldpk    _commonOverrideEnable
                lacl    _commonOverrideEnable
                bcnd    BailOut, eq
                lacb
                ldpk    _commonLastSpkIn
                sach    _commonLastSpkIn; store the high word
                smmr    AR3, _commonTempAR3
                smmr    AR4, _commonTempAR4
                ; store incoming mic sample in acc (already shifted into hi word)
                lacc    #_fbqfilter0  ; point to filter data w/ accb
                exar                  ; get signal word back in acc
                call    _fbq          ; call the filter routine
                ldpk    _commonLastSpkIn
                lacc    _commonLastSpkIn, 16
                sacb; store incoming mic sample
                in acc (already shifted into hi word)
                lacc    #_fbqfilter1  ; point to filter data w/ accb
                exar                  ; get signal word back in acc
                call    _fbq   ; call the filter routine
                ldpk    _commonDummyLoad
                rpt             _commonDummyLoad
                        nop
;               uncomment this line to remove tone detect spike but keep constant load
;               b       RResetEnergyAndExit
                ldpk    _commonOverrideCount
                lacl    _commonOverrideCount
                add     #1
                sacl    _commonOverrideCount
                sub             #40
                bcnd    ExitToneDetect, leq
; we come here every 5 ms to look at the accumulated energy
                ldpk    _commonShortOverrideTimeOut
                lacc    _commonShortOverrideTimeOut
                bcnd    AlreadyTimedOut, eq
                sub     #1; subtract until we get to zero, then stop
```

```
                sacl    _commonShortOverrideTimeOut
AlreadyTimedOut:
                ldpk    _commonOverrideThreshold
                lt      _commonOverrideThreshold
                mpy     _commonOverrideThreshold; square the threshold
                pac
                sacb
                ldpk    1+_fbq0nrg
                lacc    1+_fbq0nrg, 16; get high word in acc
                ldpk    _fbq0nrg
                adds    _fbq0nrg       ; add in low word
                sbb                    ; compare nrg with threshold
                bcnd    ResetAndExit, lt; branch if commonOverrideThreshold > fbq0nrg
                ldpk    1+_fbq1nrg
                lacc    1+_fbq1nrg, 16 ; get high word in acc
                ldpk    _fbq1nrg
                adds    _fbq1nrg       ; add in low word
                sbb                    ; compare nrg with threshold
                bcnd    ResetAndExit, lt ; branch if commonOverrideThreshold > fbq1nrg
; we only get to here if both filters have accumulated energy
; greater than the overrideThreshold
PoundDetected:
                ldpk    _commonShortOverrideTimeOut
                        ; see if it's only been a short time since last override
                lacc    _commonShortOverrideTimeOut
                bcnd    UseShortDuration, eq
                ldpk    _commonOverrideTime; use the standard override time
                lacl    _commonOverrideTime
                sacb
                b       CompareDuration
UseShortDuration:
                lack    #ShortOverrideDuration
                ; use the shorter duration if it's only been a short time since last setting
                sacb
CompareDuration:
                ldpk    _commonOverrideDuration ; increment the current duration
                lacl    _commonOverrideDuration
                add     #1
                sacl    _commonOverrideDuration
                sbb             ; see if the duration (in acc) exceeds the required time (in accb)
                bcnd    ResetEnergyAndExit, lt
                ;set the filter's accumulated energy back to zero and keep on going
OverrideDetected:
                ; both bands have exceeded the threshold for the requisite time
                ldpk    _commonDtmfAtWarmBoot
                splk    #1, _commonDtmfAtWarmBoot ; set flag to True
                ldpk    1+_fbq0nrg   ; point to filter 0 accumulated energy
                lacc    1+_fbq0nrg, 16; get high word in acc
                ldpk    _fbq0nrg ; point to filter 0 accumulated energy
                adds    _fbq0nrg ; add in low word
                ldpk    1+_commonLastFbq0Nrg
                sach    1+_commonLastFbq0Nrg ; store high word
                ldpk    _commonLastFbq0Nrg
                sacl    _commonLastFbq0Nrg; store low word
                ldpk    1+_fbq1nrg   ; point to filter 0 accumulated energy
                lacc    1+_fbq1nrg, 16; get high word in acc
                ldpk    _fbq1nrg ; point to filter 0 accumulated energy
                adds    _fbq1nrg ; add in low word
                ldpk    1+_commonLastFbq1Nrg
                sach    1+_commonLastFbq1Nrg ; store high word
                ldpk    _commonLastFbq1Nrg
                sacl    _commonLastFbq1Nrg; store low word
                b       ResetEnergyAndExit; now we wait until silence to reboot
ResetAndExit:
                ldpk    _commonDtmfAtWarmBoot ; see if override was triggered during
                lacc    _commonDtmfAtWarmBoot ; previous tone
                bcnd    ContinueReset, eq
                ldpk    _commonOperatingMode
                lacc    _commonOperatingMode
                sub     #_ModeNC2
                bcnd    DynamicsReset, neq
NC2Reset:
                apl             #TRM_OFF, PMST; make sure TRM bit is off
                b               _c_int0 ; warm boot if we're in NC2
DynamicsReset:
                ldpk    _overrideDetected ; no reboot
                lacc    #1
                sacl    _overrideDetected
ContinueReset:
```

-continued

```
            zac
            ldpk    __commonOverrideDuration
            sacl    __commonOverrideDuration ; reset duration, in units of 5 milliseconds
ResetEnergyAndExit:
            zac
            ldpk    __commonOverrideCount
            sacl    __commonOverrideCount ; reset counter
            ldpk    __fbq0nrg
            sacl    __fbq0nrg
            ldpk    __fbq0nrg+1
            sacl    __fbq0nrg+1 ; reset accumulated energy
            ldpk    __fbq1nrg
            sacl    __fbq1nrg
            ldpk    __fbq1nrg+1
            sacl    __fbq1nrg+1 ; reset accumulated energy
ExitToneDetect:
            lmmr    AR3, __commonTempAR3
            lmmr    AR4, __commonTempAR4
BailOut:
            ldpk    0 ; put DP back like NC2 likes it
            ret
;---------------------------------;
;---------------------------------;
ManOverrideDetect:;
            smmr    AR3, __commonTempAR3;
            larp    AR3             ;
            lrlk    AR3, __commonManOverrideTime;
            lacc    *               ;
            add     #1              ;
            sacl    *               ; increment time
            sub     #0ffffh         ; if we are at ffff ie approx 8s then reset
            bcnd    TEST_SWITCH, NEQ;
                                    ;
RESET_OVER:                         ;
            zac                     ; zero over ride time
            and
            sacl    *               ; over ride count
            lrlk    AR3, __commonManOverrideCount;
            sacl    *               ;
                                    ;
TEST_SWITCH:                        ;
            bit     PA4, SW1ON ; Test SW1ON status in Gate Array (bit 2).
            bcnd    SWITCH_IN, TC   ; Switch down then branch
SWITCH_OUT:                         ;
            lrlk    AR3, __commonSwitchIn;
            lacc    *               ;
            bcnd    NO_CHANGE, EQ;
            zac                     ;
            sacl    *               ; reset switchin
            b       NO_CHANGE; exit the switch is off
SWITCH_IN:                          ;
            lrlk    AR3, __commonSwitchIn;
            lacc    *               ;
            bcnd    NO_CHANGE, NEQ ;
            lacc    #1              ;
            sacl    *               ; reset switchin
                                    ; increment counters
            lrlk    AR3, __commonManOverrideCount;
            lacc    *               ;
            add     #1              ;
            sacl    *               ;
            sub     #1              ;
            bcnd    NO_SYNC, GT; Don't restart the clock
            lrlk    AR3, __commonManOverrideTime ; if counter bigger than one
            zac                     ;
            sacl    *               ;
NO_SYNC:                            ;
            lrlk    AR3, __commonManOverrideCount;
            lacc    *               ;
            .if     Lab             ;
            sub     #3              ;
            .else                   ;
            sub     #6              ;
            .endif                  ;
            bcnd    NO_CHANGE, LT;
            lacc    #1
            lrlk    AR3, __commonDtmfAtWarmBoot;
            sacl    *               ;
            apl     #TRM_OFF, PMST; make sure trm bit is OFF
```

-continued

```
                    b           __c__int0 ; warm boot if we're in NC2
NO_CHANGE:                      ;
            lmmr    AR3, __commonTempAR3;
            ret                 ;
;---------------------------------; end of manual override detect
;
; DTMF tone generation
;
                    .global __Dtmf0Start
                    .global __Dtmf0End
                    .global __Dtmf1Start
                    .global __Dtmf1End
                    .global __Dtmf2Start
                    .global __Dtmf2End
                    .global __Dtmf3Start
                    .global __Dtmf3End
                    .global __Dtmf4Start
                    .global __Dtmf4End
                    .global __Dtmf5Start
                    .global __Dtmf5End
                    .global __Dtmf6Start
                    .global __Dtmf6End
                    .global __Dtmf7Start
                    .global __Dtmf7End
                    .global __Dtmf8Start
                    .global __Dtmf8End
                    .global __Dtmf9Start
                    .global __Dtmf9End
                    .global __DtmfStarStart
                    .global __DtmfStarEnd
                    .global __DtmfPoundStart
                    .global __DtmfPoundEnd
SaveRomSpace        .set    1   ; leave out star and pound tones to save space
__Dtmf1Start
            .word   00000h, 00000h, 00000h, 00000h, 00020h, 0fe1ah, 0f809h, 0fleah ; 7
```

```
.word   00000h                  ; 6841
        .endif ; SaveRomSpace
__DtmfPoundEnd:
.word   00000h
/*                              DTMF.h    */
#ifndef     __DTMF__
#define     __DTMF__
/***** DTMF detector stuff *************************/
#define Lightenup                       False
#define UsingAllFilters                 False
#define ENERGY_SCALER_SHIFT 6
#define SAMPLE_BITS
        16
#define ENERGY_LIMIT_HIGH               83886080
#define ENERGY_LIMIT_LOW                10485760
#define GAIN_REDUCTION_STEP 31838
#define GAIN_INCREASE_STEP  4
#define LPFCOEF
        8483
#define INPUTTHRESHOLD
        200000          /* 32 bit num representing energy */
#define MinStateDuration    10
        /* how consecutive chunks for statemachine recognition */
#define SilenceTimeout                  50
                /* how many consec chunks of silence to trigger add'l explicit msg
*/
#define DIAL_TONE                       'd'
#define RING                            'r'
#define BUSY                            'b'
#define SILENCE                         's'
#define UNDETERMINED                    '?'
#if LightenUp
        #define                 FILTERTHRESHOLD 19000
        #define                 FILTERDIFFERENCE 29000
        /* lower = fewer false +, more false */
#else
        #define                 FILTERTHRESHOLD 28400
        #define                 FILTERDIFFERENCE 16000
```

-continued

```
        /* lower = fewer false +, more false */
#endif/* LightenUp */
typedef  void (*CallBackRoutinePtr)(DtmfState state, ushort prevDuration);
typedef struct {
        DtmfState                       state;
        DtmfState                       previous_state;
        DtmfState                       previous_previous_state;
        ushort                          stateDuration;
        ushort                          prevDuration;
        SpeechPtr                           inputPtr;
        short                           inputGain;
        short                           inputDiffState;
        short                           inputIntState;
#if UsingAllFilters
        BiQuadPtr                       filterPtr[12];
        long                            filterEnergyLPFstates[12];
#else
        BiQuadPtr                       filterPtr[7];
        long                            filterEnergyLPFstates[7];
#endif
        short                           LPFcoef;
        long                            inpuThreshold;
        long                            inputEnergyLPFstate;
        dB                              prevInputLevel;
        short                           filterThresholdCoef;
        short                           filterDifferenceCoef;
        DtmfState                       dtmfArray[4][4];
        Meter                           dtmfMeter;
        CallBackRoutinePtr              callBackRoutine;
} Dtmfparams, * DtmfParamsPtr;
/* prototypes from dtmf.c */
void ProcessDtmf(DtmfParamsPtr x);
void ProcessChunk(DtmfParamsPtr dtmfPtr, short numSamples);
void ProcessChunkState(DtmfParamsPtr dtmfPtr);
void InitDtmf(DtmfParamsPtr dtmfPtr);
extern DtmfParams dtmfData;
#endif /* _DTMF_*/
                                /* Play Repeating Tone Code */
XmitSpkAttLevel(commonSpkAttn);
XmitFdsStatus( );
}
void XmitListenableJlkStatus(void)
{
        XmitListenableVersionNumber( );
        Wait(1000);
        XmitListenableDcaLevel(commonDcaLevel);
        Wait(1000);
        XmitListenableSpkAttLevel(commonSpkAttn);
        Wait(1000);
        XmitListenableFdsStatus( );
}
void XmitDtmfWave(void)
{
        Wait(50);
        PlayMicSnd(&dtmf1Start,&DtmfPoundEnd,0,Fetch WorkInRom((short
        *)&pinkToneLevel));
}
void XmitPinkTone(void)
{
        PlayMicSnd(&PinkToneStart;&PinkToneEnd,5,FetchWorkInRom((short
                *)&pinkToneLevel));
}
void XmitTestTone(void)
{
        PlayMicSnd(testToneStart,testToneEnd,testToneLoops,testToneLevel);
}
void XmitBeepTone(void)
{
        PlayMicSnd(&Sine1kStart,&Sine1kEnd,26,FetchWorkInRom((short
                *)&sineToneLevel));
}
void XmitStarTone(void)
{
        PlayMicSnd(&Sine500Start,&Sine500End,13,FetchWordInRom((short
        *)&sineToneLevel));
}
void XmitPoundTone(void)
{
        PlayMicSnd(&Sine2kStart,&Sine2kEnd,52,Fetch WordInRom((short
```

-continued

```
                *)&sineToneLevel));
}
void PlayWaitingTone9void)
{
        Wait(60);
        PlaySpkSnd(&Sine1kStart,&Sine1kEnd,26,minus46dB);
        Wait(600);
        PlaySpkSnd(&Sine2kStart,&Sine2kEnd,52,minus46dB);
        Wait(600);
        PlaySpkSnd(&Sine1kStart,&Sine1kEnd,26,minus46dB);
        Wait(600);
        PlaySpkSnd(&Sine500Start,&Sine500End,13,minus40db);
        Wait(600);
        PlaySpkSnd(&Sine1kStart,&Sine1kEnd,26,minus46dB);
        Wait(600);
        P1aySpkSnd(&Sine2kStart,&Sine2kEnd,52,minus46db);
        Wait(580);
        PlaySpkSnd(&Sine500Start,&Sine500End,13,minus40db);
        NextSegment = FirstSegment;
}
void PlayRepeatingWaitingTone(void)
{
        if(NextSegment == FirstSegment) {
                PlaySpkSend(&Sine1kStart,&Sine1kEnd,26,minus46dB);
                Wait(600);
                NextSegment = SecondSegment;
        }
        else if (NextSegment == SecondSegment) {
                PlaySpkSnd(&Sine2kStart,&Sine2kEnd,52,minus46dB);
                Wait(600);
                NextSegment = ThirdSegment;
        }
        else if (NextSegment = ThirdSegment) {
                PlaySpkSnd(&Sine1kStart,&Sine1kEnd,26,minus46dB);
                Wait(600);
                NextSegment = FourthSegment;
        }
        else if (NextSegment = FourthSegment) {
                PlaySpkSnd(&Sine500Start,&Sine500End,13,minus40dB);
                Wait(600);
                NextSegment = FifthSegment;
        }
        else if NextSegment = FifthSegment) {
                PlaySpkSnd(&Sine1kStart,&Sine1kEnd,26,minus46dB);
                Wait(600);
                NextSegment = SixthSegment;
        }
        else if (NextSegment == SixthSegment) {
                PlaySpkSnd(&Sine2kStart,&Sine2kEnd,52,minus46dB);
                Wait(580);
                NextSegment = SeventhSegment;
        }
        else {
                PlaySpkSnd(&Sine500Start,&Sine500End,13,minus40dB);
                Wait(600);
                NextSegment = FirstSegment;
        }
}
void XmitWaitingTone(void)
{
        PlayMicSnd(&Sine1kStart,&Sine1kEnd,26,minus20d);
        Wait(600);
        XmitErrorTone( );
        }
}
else
/* if override key is zero, then no security code required *?
if (NeedCode == remoteControlMode && 0x0000 == commonOverrideCode) {
        remoteControlMode = Tuning;
        spkMute = True;
        XmitPinkTone( );
        InjtDtmfHistory( );
        PlayWaitingTone( );
        return;
}
else
/* NeedCode mode looks for the secret decoder ring code and nothing else */
if(NeedCode == remoteControlMode && Silence == state) {
        state = dtmfHistory[current]; /* use the state just prior to silence */
```

-continued

```
        /* XmitBeepTone( ); *//* no key click response during security sessions */
        if(((commonOverrideCode & 0x0F00)>>8) == dtmfHistory[secondMostRecent]) {
                if(((commonOverridCode & 0x00F0)>>4) == dtmfHistory[mostRecent]) {
                        if((commoncoverrideCode & 0x000F) == dtmfHistory[current]) {
                                remoteControlMode = Tuning,
                                SpkMute = True;
                                XmitPinkTone( );
                                InitDtmfHistory( );
                                PlayWaitingTone( );
                        }
                }
        }
}
        if(remoteControMode == Tuning || remoteControlMode == Expert)
        PlayRepeatingWaitingTone( );
}
void TestFrame(void)
{
        dtmHistory[fourthMostRecent] = Unknown;
        dtmHistory[thirdMostRecent] = Unknown;
        dtmHistory[secondMostRecent] = Nine;
        dtmHistory[mostRecent] = Zero;
        dtmHistory[current] = Zero;
        remoteControlMode = Expert;
        RemoteControl(Silence, 100);
}
```

While this source code and this description of the hardware requirements of the best mode of this invention are provided to give a complete description of the function and use of the invention, it is, of course, contemplated that the inventive concept may be implemented through other techniques in other embodiments and the detailed steps of this invention as described in its current best mode of operation may also change without changing the essential inventive concept of the method, which is the remote calibration of a telephone headphone, to provide improved audio quality, in a reliable process, easy to employ by both the customer-user and the customer service representative. Also, while the current best mode use of this invention is in the calibration of a telephone headset, specifically a Jabra 1000, alternative uses of this invention can also be applied to calibrate other telephone communications equipment. All such other uses of the method of this invention should be considered covered by the scope of the claims.

We claim:

1. A method for calibrating telephone equipment to a telephone base unit and to the ambient noise environment in which these exist, the method comprising the steps of:

(A) receiving a calibration request;

(B) initializing the telephone equipment, said telephone equipment being configured for use by a user in telephone communications and said telephone equipment having audio transmission level circuitry, noise reduction circuitry and a capacity for storing and modifying audio parameters;

(C) taking control of the telephone equipment;

(D) providing an adjustment for the telephone equipment transmission level;

(E) storing said adjustment for the telephone equipment transmission level;

(F) providing an adjustment to compensate for the ambient noise environment; and wherein said providing an adjustment to compensate for the ambient noise environment further comprises the steps of:
 (1) measuring to determine if the transmission level is correct;
 (2) entering a command to decrease the transmission level if the transmission level is high;
 (3) entering a command to increase the transmission level if the transmission level is low;
 (4) determining if all calibrations have been completed;
 (5) storing all calibration adjustments if all calibrations have been completed; and
 (6) returning telephone equipment control to the user if all calibrations have been completed and all adjustments have been stored (G) storing said ambient noise environment compensation adjustment;

(H) providing an adjustment for the tuning of the telephone equipment audio parameters;

(I) storing said telephone equipment audio parameter adjustments; and (J) returning control of the telephone equipment to the user.

* * * * *